(12) United States Patent
Satoh et al.

(10) Patent No.: US 12,370,684 B2
(45) Date of Patent: Jul. 29, 2025

(54) CONTROL DEVICE, CONTROL METHOD AND STORAGE MEDIUM

(71) Applicant: NEC Corporation, Tokyo (JP)

(72) Inventors: Mineto Satoh, Tokyo (JP); Nobuharu Kami, Tokyo (JP); Masatsugu Ogawa, Tokyo (JP); Hisaya Wakayama, Tokyo (JP); Takehiro Itou, Tokyo (JP); Hiroyuki Oyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 359 days.

(21) Appl. No.: 17/799,721

(22) PCT Filed: Feb. 25, 2020

(86) PCT No.: PCT/JP2020/007418
§ 371 (c)(1),
(2) Date: Aug. 15, 2022

(87) PCT Pub. No.: WO2021/171349
PCT Pub. Date: Sep. 2, 2021

(65) Prior Publication Data
US 2023/0082482 A1 Mar. 16, 2023

(51) Int. Cl.
*B25J 9/16* (2006.01)
(52) U.S. Cl.
CPC ... *B25J 9/1656* (2013.01); *G05B 2219/50391* (2013.01)
(58) Field of Classification Search
None
See application file for complete search history.

(56) References Cited

U.S. PATENT DOCUMENTS 9,689,696 B1 * 6/2017 Russell ............... G05D 1/0287
9,989,371 B1 * 6/2018 Russell ............... G05D 1/0297
(Continued)

FOREIGN PATENT DOCUMENTS

| JP | 2004-283958 A | 10/2004 |
| JP | 2005-508761 A | 4/2005 |

(Continued)

OTHER PUBLICATIONS

International Search Report for PCT Application No. PCT/JP2020/007418, mailed on Apr. 7, 2020.
(Continued)

*Primary Examiner* — Wade Miles
*Assistant Examiner* — Arslan Azhar

(57) ABSTRACT

The control device 1A mainly includes a determination means 15A, an abstract state setting means 16A, and a sequence generation means 17A. The determination means 15A determines, based on at least one of environment information relating to environment observed in a workspace of a controlled device to be controlled, state information relating to a state of the controlled device, and stored information that is stored information relating to the objective task to be executed by the controlled device, whether or not the objective task can be completed. The abstract state setting means 16A sets, when determined that the objective task cannot be completed, an abstract state in the workspace based on at least one of the environment information or the stored information. The sequence generation means 17A generates, based on the abstract state and the objective task, a sequence of subtasks to be executed by the controlled device.

14 Claims, 14 Drawing Sheets

(56) References Cited

U.S. PATENT DOCUMENTS

| | | | |
|---|---|---|---|
| 11,577,741 B1 * | 2/2023 | Reschka | ............ B60W 50/045 |
| 2002/0169733 A1 | 11/2002 | Peter, II | |
| 2010/0206651 A1 | 8/2010 | Nagasaka | |
| 2015/0331416 A1 | 11/2015 | Feniello et al. | |
| 2018/0085922 A1 | 3/2018 | Ooba | |
| 2019/0143524 A1 | 5/2019 | Takahashi et al. | |

FOREIGN PATENT DOCUMENTS

| | | |
|---|---|---|
| JP | 2010-142940 A | 7/2010 |
| JP | 2010-188471 A | 9/2010 |
| JP | 2018-051684 A | 4/2018 |
| JP | 2019-084664 A | 6/2019 |

OTHER PUBLICATIONS

Japanese Office Action for JP Application No. 2022-502355, mailed on May 9, 2023 with English Translation.

* cited by examiner

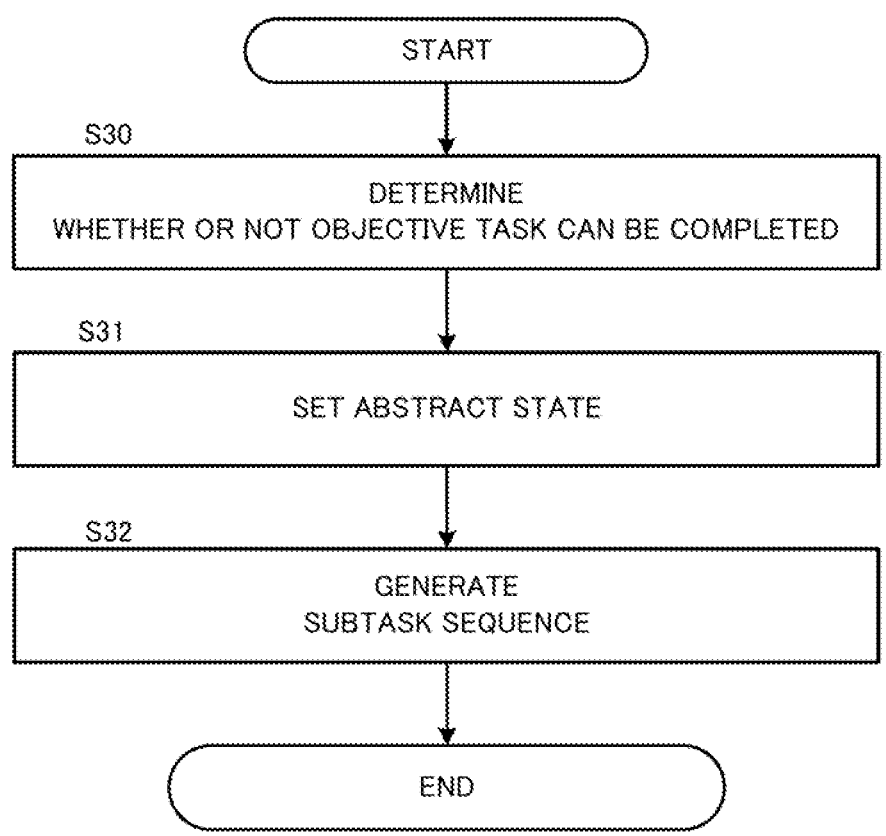

CONTROL DEVICE, CONTROL METHOD AND STORAGE MEDIUM

This application is a National Stage Entry of PCT/JP2020/007418 filed on Feb. 25, 2020, the contents of all of which are incorporated herein by reference, in their entirety.

TECHNICAL FIELD

The present invention relates to a technical field of a control device, a control method, and a storage medium for controlling a controlled device.

BACKGROUND ART

There is proposed such a control method to perform control of a robot necessary for executing the task when a task to be performed by a robot is given. For example, Patent Literature 1 discloses a robot controller configured, when placing a plurality of objects in a container by a robot with a hand for gripping an object, to determine possible orders of gripping the objects by the hand and to determine the order of the objects to be placed in the container based on the index calculated with respect to each of the possible orders.

CITATION LIST

Patent Literature

Patent Literature 1: JP 2018-51684A

SUMMARY

Problem to be Solved

If a change in environment that is unexpected at the beginning of the plan occurs after determining steps (sequence) for a controlled device such as a robot to execute a objective task, the determined sequence may not be able to be executed. There are also cases in which it is impossible to properly determine the sequence if there is an uncertainty in the environment to be measured at the time of generating the sequence. In contrast, Patent Literature 1 is silent on the process in consideration of changes in the environment that was not assumed at the time of generating the sequence and the presence of uncertain elements of the environment in generating the sequence.

One object of the present invention is to provide a control device, a control method, and a recording medium capable of suitably generating a sequence to be executed by a controlled device in view of the issues described above.

Means for Solving the Problem

In one mode of the control device, there is provided a control device including: a determination means configured to determine, based on at least one of environment information relating to environment observed in a workspace of a controlled device to be controlled, state information relating to a state of the controlled device, and stored information that is stored information relating to the objective task to be executed by the controlled device, whether or not the objective task can be completed; an abstract state setting means configured to set, if it is determined that the objective task cannot be completed, an abstract state in the workspace based on at least one of the environment information or the stored information; and a sequence generation means configured to generate, based on the abstract state and the objective task, a sequence of subtasks to be executed by the controlled device.

In one mode of the control method, there is provided a control method executed by a computer, the control method including: determining, based on at least one of environment information relating to environment observed in a workspace of a controlled device to be controlled, state information relating to a state of the controlled device, and stored information that is stored information relating to the objective task to be executed by the controlled device, whether or not the objective task can be completed; setting, when it is determined that the objective task cannot be completed, an abstract state in the workspace based on at least one of the environment information or the stored information; and generating, based on the abstract state and the objective task, a sequence of subtasks to be executed by the controlled device.

In one mode of the storage medium, there is provided a storage medium storing a program executed by a computer, the program causing the computer to function as: a determination means configured to determine, based on at least one of environment information relating to environment observed in a workspace of a controlled device to be controlled, state information relating to a state of the controlled device, and stored information that is stored information relating to the objective task to be executed by the controlled device, whether or not the objective task can be completed; an abstract state setting means configured to set, if it is determined that the objective task cannot be completed, an abstract state in the workspace based on at least one of the environment information or the stored information; and a sequence generation means configured to generate, based on the abstract state and the objective task, a sequence of subtasks to be executed by the controlled device.

Effect

An example advantage according to the present invention is to suitably generate a sequence to be executed by a controlled device

BRIEF DESCRIPTION OF THE DRAWINGS

FIG. 14 illustrates an example of a flowchart executed by the control device in the second example embodiment.

EXAMPLE EMBODIMENTS

Hereinafter, an example embodiment of a control device, a control method, and a storage medium will be described with reference to the drawings.

First Example Embodiment (1) System Configuration

Figure 1:
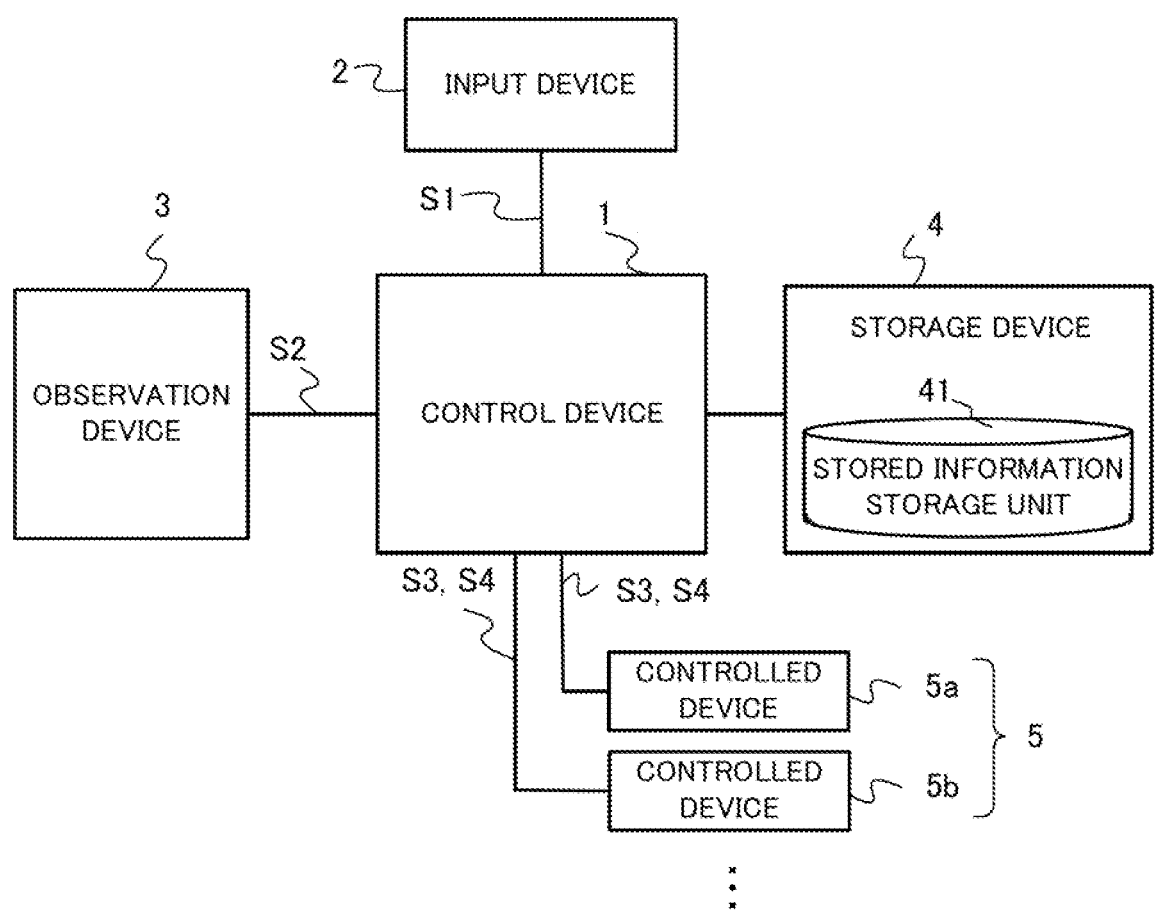
FIG. 1 illustrates the configuration of a task execution system according to a first example embodiment.

FIG. 1 shows the configuration of the task execution system 100 according to the first example embodiment. The task execution system 100 mainly includes a control device 1, an input device 2, an observation device 3, a storage device 4, and a plurality of controlled devices 5 (5a, 5b, . . . ).

When a task (also referred to as "objective task") to be executed by the controlled devices 5 is designated, the control device 1 converts the objective task into a sequence on a time step basis and supplies the sequence to the controlled devices 5. Hereafter, the term "subtask" indicates a task (command) into which the objective task is decomposed by a unit that can be accepted by the controlled devices 5.

The control device 1 is electrically connected through wired or wireless communication to the input device 2, the observation device 3, the storage device 4 and the controlled devices 5. The control device 1 receives input information "S1" which specifies the objective task from the input device 2. Further, the control device 1 receives the environment information "S2" to be described later from the observation device 3. Further, the control device 1 receives the state information "S3" representing the current state of each controlled device 5 from each controlled device 5. Then, the control device 1 transmits, to each controlled device 5, control information "S4" relating to the control of each controlled device 5. The control device 1 transmits, to each of the controlled devices 5, control information S4 specifying a sequence (also referred to as "subtask sequence") of subtasks to be executed by each of the controlled devices 5.

The input device 2 is an interface that accepts an input by the user and examples of the input device 2 include a touch panel, a button, a keyboard, and a voice input device. The input device 2 supplies the input information S1 generated based on the input by the user to the control device 1.

The observation device 3 includes one or more external sensors configured to perform observation within a target range of observation including a space (referred to as "workspace Stag") in which the controlled devices 5 executes the objective task and examples of the external sensors include a camera, a range finder sensor, a sonar, and a combination thereof. One of the external sensors may be a sensor fixed to observe the workspace Stag or may be a self-propelled sensor or a flying sensor (including a drone) that moves within the workspace Stag. Then, the observation device 3 generates, based on the output signal of these external sensors, environment information "S2" indicating the environment in the workspace Stag. The environment information S2 includes information on the type, position and attitude of the respective objects present in the workspace Stag. Here, the term "object" herein refers to any object present in the workspace Stag, and includes a component handled by a controlled device 5 and a controlled device 5, a target object of operation, and an obstacle.

It is noted that the control device 1 may execute the process of generating the environment information S2 from the output signal of the external sensors in place of the observation device 3. In this case, the observation device 3 supplies the output signal from the external sensors to the control device 1. The output signal from the external sensors may be image data taken in the workspace Stag or may be point group data indicating the position of an object in the workspace Stag.

The storage device 4 includes a stored information storage unit 41. The stored information storage unit 41 stores stored information that is stored information relating to the objective task to be executed by the controlled devices 5. The details of the stored information will be described later with reference to FIG. 3. The storage device 4 may be an external storage device such as a hard disk connected to or built in to the control device 1, or may be a recording medium such as a flash memory. Further, the storage device 4 may be a server device for performing data communication with the control device 1. Further, the storage device 4 may include a plurality of storage devices and the stored information may be dispersedly stored by the plurality of storage devices.

The controlled devices 5 each is a device to be controlled by the control device 1, and examples of the controlled devices 5 include an automated guided vehicle, a robot, a conveyor belt, and any other device configured to perform a predetermined operation by receiving an electrical signal. Further, the controlled devices 5 may be an assembly of industrial machines for each line in case of a line production system or for each cell in case of a cell production system. The controlled devices 5 each includes various sensors such as an internal sensor for detecting a self-state and an external sensor and, based on the output signal from the sensors, generates state information S3 indicating the current state of the controlled device 5. Examples of sensors included in the controlled devices 5 include a positioning sensor, such as a GPS (Global Positioning System) receiver and an IMU (Inertial Measurement Unit), and a sensor configured to detect the current, voltage, temperature, and/or internal resistance of a predetermined component of the controlled device 5. The state information S3 may also include information such as the current position, angle, and the like of each actuator of the controlled device 5. When receiving the control information S4 from the control device 1, the controlled device 5 executes a subtask for each time step indicated by the control information S4.

The configuration of the task execution system 100 shown in FIG. 1 is an example, and various changes may be applied to the configuration. For example, there may be a single controlled device 5 or more than two controlled devices 5. Further, a controlled device 5 may function as the observation device 3. In this case, the controlled device 5 generates the environment information S2 based on the output signal from one or more external sensors provided at itself, and supplies the environment information S2 to the control device 1. Further, the input device 2 and the storage device 4 may be integrated with the control device 1 in such a state where they are incorporated in the control device 1. In this case, the control device 1 may be a tablet terminal. Further, the control device 1 may be configured by a plurality of devices. In this case, the plurality of devices functioning as the control device 1 exchange information necessary to execute the pre-allocated process with one another. Further, the control device 1 may be integrated into a controlled device 5. Further, when there are plural controlled devices 5, any one of the controlled devices 5 may act as a master unit equipped with the function of the control device 1 while the other controlled device(s) 5 act as a slave unit.

(2) Hardware Configuration

Figure 2:
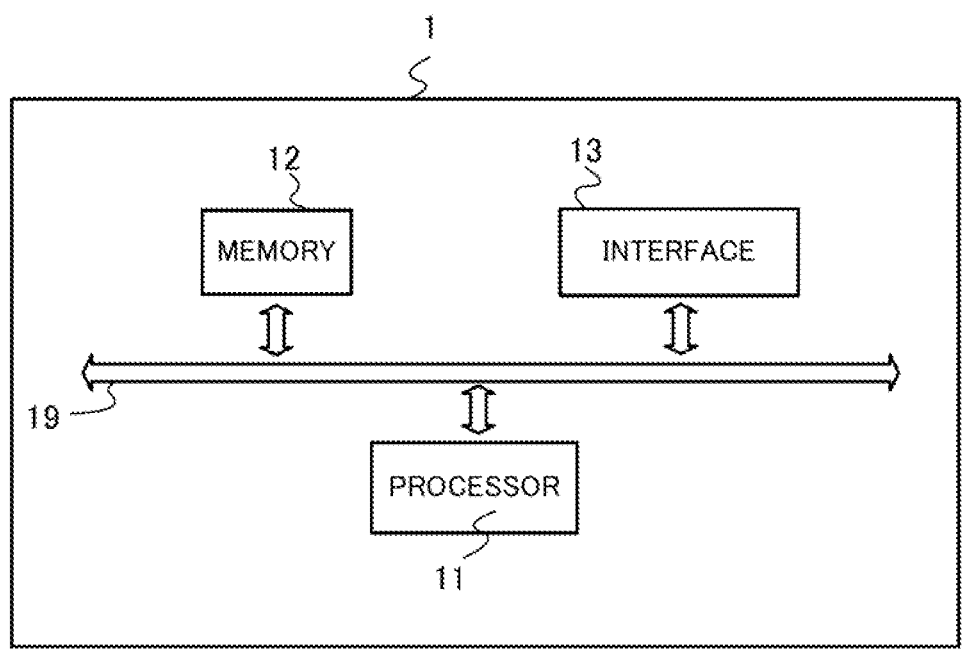
FIG. 2 illustrates the hardware configuration of a control device.

FIG. 2 shows the hardware configuration of the control device 1. The control device 1 includes, as hardware, a processor 11, a memory 12, and an interface 13. The processor 11, the memory 12, and the interface 13 are connected via a data bus 19 to one another.

The processor 11 executes a predetermined process by executing a program stored in the memory 12. The processor 11 is one or more processors such as a CPU (Central Processing Unit) and a GPU (Graphics Processing Unit).

The memory 12 is configured by various volatile and non-volatile memories such as a RAM (Random Access Memory) and a ROM (Read Only Memory). Further, the memory 12 stores a program for the control device 1 to execute a predetermined process. The memory 12 is used as a work memory and temporarily stores information acquired from the storage device 4. The memory 12 may function as a storage device 4. In contrasts, the storage device 4 may function as the memory 12 of the control device 1. The program executed by the control device 1 may be stored in a storage medium other than the memory 12.

The interface 13 is an interface for electrically connecting the control device 1 to other external devices. For example, the interface 13 includes an interface for connecting the control device 1 to the input device 2, an interface for connecting the control device 1 to the observation device 3, and an interface for connecting the control device 1 to the storage device 4. The interface 13 also includes an interface for connecting the control device 1 to each controlled device 5. These connections may be wired connections and may be wireless connections. For example, the interface for connecting the control device 1 to the storage device 4 may be a communication interface for wired or wireless transmission and reception of data to and from the storage device 4 under the control of the processor 11. In another example, the control device 1 and the storage device 4 may be connected by a cable or the like. In this case, the interface 13 includes an interface which conforms to an USB (Universal Serial Bus), a SATA (Serial AT Attachment), or the like for exchanging data with the storage device 4.

The hardware configuration of the control device 1 is not limited to the configuration shown in FIG. 2. For example, as described in the description in FIG. 1, the control device 1 may include at least one of the input device 2, the observation device 3, and the storage device 4. Further, the control device 1 may be connected to or incorporate a sound output device such as a speaker.

(3) Data Structure

Next, the data structure of the stored information stored in the stored information storage unit 41 will be described.

Figure 3:
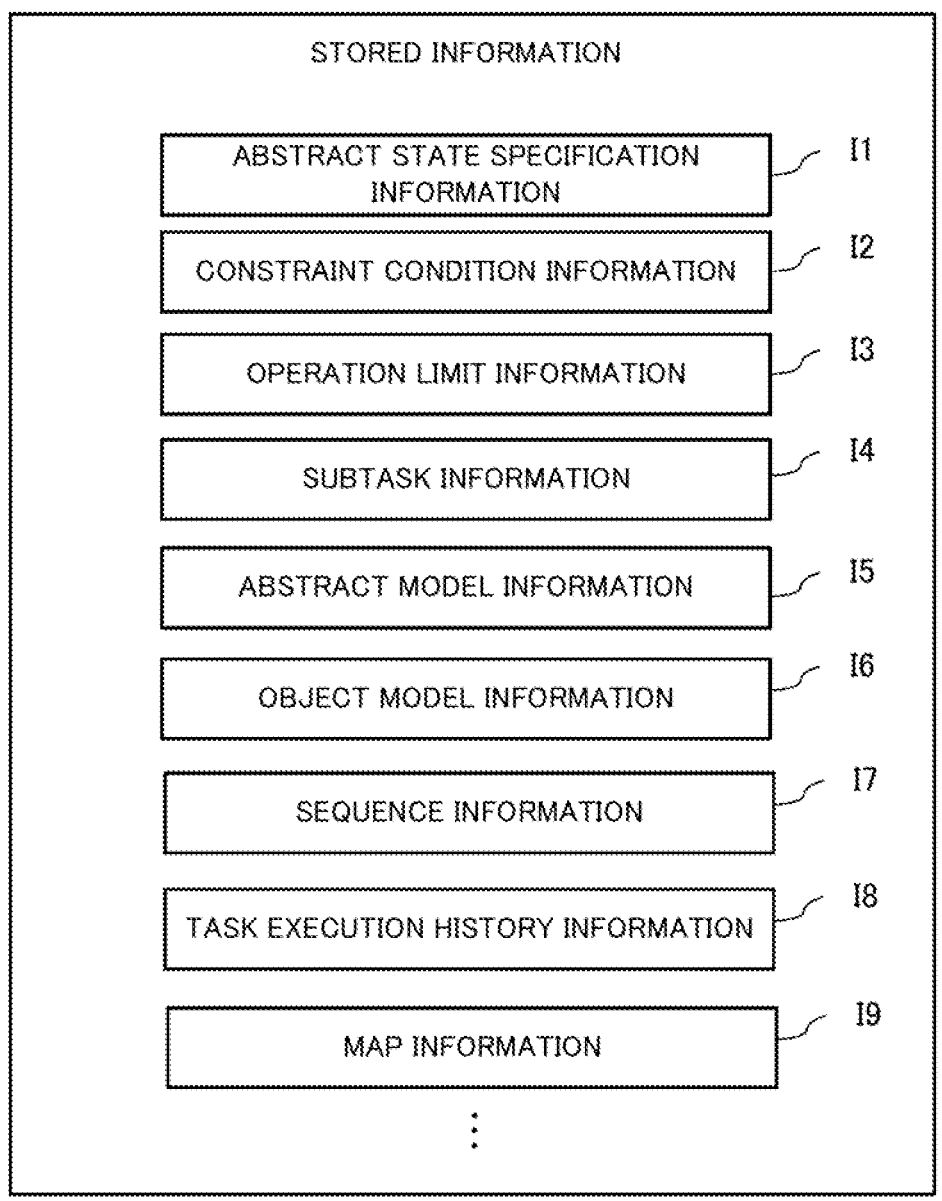
FIG. 3 illustrates an example of the data structure of stored information.

FIG. 3 shows an example of the data structure of the stored information stored in the stored information storage unit 41. As shown in FIG. 3, the stored information storage unit 41 includes abstract state specification information I1, constraint condition information I2, operation limit information I3, subtask information I4, abstract model information I5, object model information I6, sequence information I7, task execution history information I8, and map information I9.

The abstract state specification information I1 specifies an abstract state to be defined in order to generate the subtask sequence. The above-mentioned abstract state is an abstract state of an object in the workspace Stag, and is defined as a proposition to be used in the target logical formula to be described later. For example, the abstract state specification information I1 specifies the abstract state to be defined for each type of objective task. The objective task may be a variety of types of tasks and examples of the objective task include pick-and-place (pick-up and move process), product assembly, load transport, crop harvesting, security, and capture of a moving object. These objective tasks may be tasks performed in cooperation (coordination) with a person.

The constraint condition information I2 indicates constraint conditions of performing the objective task. In such a case where the objective task is pick-and-place, the constraint condition information I2 indicates, for example, a constraint that the controlled devices 5 must not be in contact with an obstacle, and a constraint that the controlled devices 5 must not be in contact with each other, and the like. In such a case that the objective task is load transport, the constraint condition information I2 indicates a constraint that the controlled devices 5 must not be in contact with any obstacles such as a wall and a constraint regarding the movable range thereof The constraint condition information I2 may be information in which the constraint conditions suitable for each type of the objective task are recorded.

The operation limit information I3 shows information on the operation limit of the controlled device 5 to be controlled by the control device 1. The operation limit information I3 is information defining the upper limits of the speed, acceleration, and angular velocity of the controlled devices 5. The operation limit information I3 may be information defining an operation limit for each movable portion or joint of the controlled devices 5.

The subtask information I4 indicates information on subtasks that the controlled devices 5 can accept. For example, when the objective task is pick-and-place and a controlled device 5 is a robot arm, the subtask information I4 defines a subtask "reaching" that is the movement of the robot arm, and a subtask "grasping" that is the grasping by the robot arm. The subtask information I4 may indicate information on subtasks that can be used for each type of objective task. The subtask information I4 may also include information (also referred to as "subtask execution condition information") on conditions to be required for executing the subtask by the controlled devices 5. For example, the subtask execution condition information may indicate a condition relating to a component to be used by the controlled device 5 to execute the target subtask, or may indicate a condition relating to the positions of the controlled devices 5 or a condition relating to the peripheral environment of the controlled devices 5.

The abstract model information I5 is information on a model (referred to as "abstract model") in which the dynamics in the workspace Stag are abstracted. In some embodiments, the abstract model is represented by a model in which real dynamics are abstracted by a hybrid system, as will be described later. The abstract model Information I5 includes information indicative of the switching conditions of the dynamics in the above-mentioned hybrid system. For example, in such a case that a controlled device 5 is a robot arm and the objective task is pick-and-place, one of the switching conditions is that a target object to be moved cannot be moved unless it is gripped by the hand of the robot arm. In another example, when the objective task is carrying the load to an adjacent room separated by a manual door with a door knob, one of the switching conditions is that the controlled device 5 is unable to move the door without twisting the door knob. The abstract model information I5 has information on an abstract model suitable for each type of objective task.

The object model information I6 is information on the object model of each object to be recognized by the observation device 3. For example, the object model information I6 includes: information which the control device 1 requires to recognize the type, the position, the posture, the ongoing (currently-executing) operation and the like of the each object described above; and three-dimensional shape information such as CAD (Computer Aided Design) data for recognizing the three-dimensional shape of the each object. The former information includes the parameters of an inference engine obtained by learning a learning model that is used in a machine learning such as a neural network. For example, the above-mentioned inference engine is learned in advance to output the type, the position, the posture, and the like of an object shown in the image when an image is inputted thereto.

The sequence information I7 is information related to the subtask sequence that specifies the operations by the controlled device 5. The subtask sequence is generated based on the objective task and is sent to the controlled device 5 as the control information S4. The sequence information I7 includes information indicating the execution order and execution timing of each subtask included in the subtask sequence. In some embodiments, the sequence information I7 includes, in addition to the information indicating the subtask sequence, the subtask execution condition information regarding each subtask included in the subtask sequence.

The task execution history information I8 is information indicating the execution history of the controlled device 5 for the objective task set in the past. For example, in the task execution history information I8, for each objective task set in the past, there are associated the type of the each objective task, a subtask sequence of the controlled device 5 set for the each objective task, the result of whether or not the controlled device 5 has completed the subtask sequence, and the execution conditions of the subtask sequence. The term "result of whether or not the controlled device 5 has completed the subtask sequence" indicates, in other words, a history indicating whether or not the controlled device 5 can execute the first-generated subtask sequence without error. Examples of "execution conditions of the subtask sequence" include the location of the workspace Stag, the temperature in workspace Stag, the humidity in the workspace Stag, the time period when the objective task was executed, the types and the number of usable components, and any combination thereof. In addition, the task execution history information I8 may further include information regarding abstract states in the workspace Stag set for each objective task set in the past.

The map information I9 is information indicating the map (layout) in the workspace Stag. Examples of the map information I9 include information indicating the movable range (passage) within the workspace Stag, and information indicating the position (including the size and range) of a fixed object such as a wall, an installation object, and a staircase.

In addition to the information described above, the stored information storage unit 41 may store various kinds of information related to the generation process of the subtask sequence. For example, the stored information storage unit 41 may further include information on an abstracted dynamic model of the whole and the movable portions of the controlled device 5, and information on a simplified model for calculating a time required for the controlled device 5 to perform a predetermined operation. If a controlled device 5 is a robot arm that perform pick-and-place, the stored information storage unit 41 may include a dynamic model of the abstracted robot arm and a simplified model for calculating a required time for grasping an object by the robot arm.

(4) Functional Block

Figure 4:
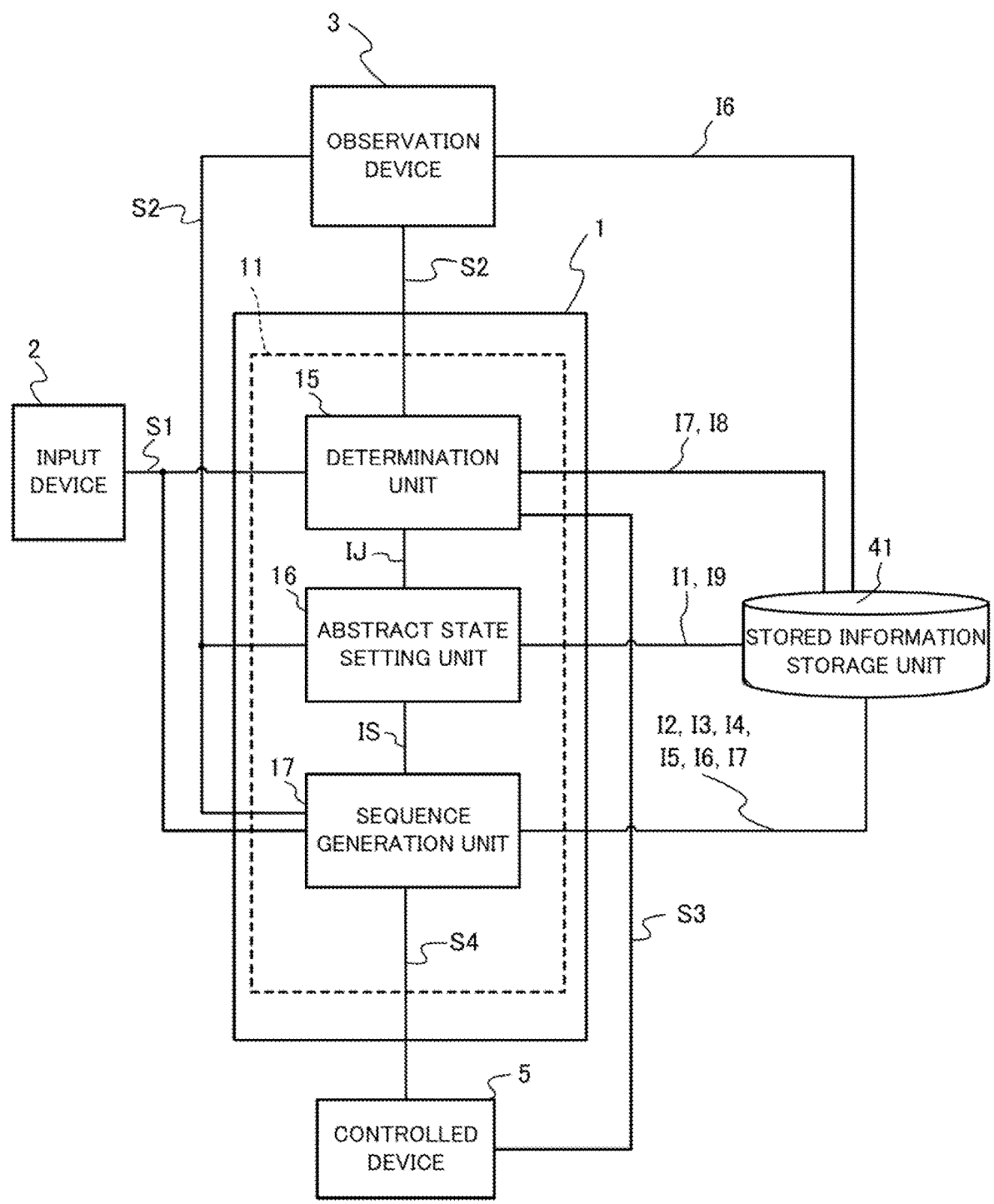
FIG. 4 illustrates an example of a functional block of the control device.

FIG. 4 is an example of a functional block of the control device 1. The processor 11 of the control device 1 functionally includes a determination unit 15, an abstract state setting unit 16, and a sequence generation unit 17. In FIG. 4, an example of data to be transmitted and received between the blocks is shown, but it is not limited thereto.

The observation device 3 refers to the object model information I6 or the like included in the stored information, and analyzes the output signal from one or more external sensors such as a camera included in the observation device 3 by a technique for recognizing the environment in the workspace Stag such as a technique using an image processing technique, an image recognition technique, a speech recognition technique, a technique using a RFID (Radio Frequency Identifier). Thus, the observation device 3 recognizes the type, position, and posture of each object present in the workspace Stag, and supplies the recognition result to the determination unit 15 as the environment information S2. It is noted that there are various techniques for recognizing the type, the position, and posture of an object from the output signal from one or more external sensors such as a camera and therefore the observation device 3 may perform the above-described recognition by using any of these techniques to generate the environment information S2. Further, as described above, the process of generating the environment information S2 based on the output signal from the external sensors may be performed by the control device 1. The external sensors used for generating the environment information S2 may include an external sensor provided in the controlled device 5.

The determination unit 15 determines whether or not the objective task specified by the input information S1 can be completed based on at least one of the environment information S2, the state information S3, or the stored information. In this case, as will be described later, after the objective task is specified by the input information S1, the determination unit 15 makes, in advance of generating the subtask sequence, a determination (also referred to as "first feasibility determination") as to the feasibility of the objective task (i.e., whether or not the objective task can be completed). Further, during execution of the subtask sequence by the controlled device 5 based on the control information S4 after the generation of the subtask sequence, the determination unit 15 makes a determination (referred to as "second feasibility determination") as to whether or not the controlled device 5 can properly execute the subtask sequence. As described above, the determination unit 15 performs the first feasibility determination, which is the feasibility determination as to the objective task before the generation of the subtask sequence, and the second feasibility determination, which is the feasibility determination of the objective task during the execution of the subtask sequence by the controlled device 5. Specific description of the first feasibility determination and the second feasibility determination will be described later. Then, the determination unit 15 supplies the abstract state setting unit 16 with information (also referred to as "determination information IJ") indicating the determination result of either the first feasibility determination or the second feasibility determination.

Based on the environment information S2 supplied from the observation device 3, the determination information IJ, and the abstract state specification information I1 acquired from the stored information storage unit 41, the abstract state setting unit 16 sets an abstract state in the workspace Stag that needs to be considered when executing the objective task. In this case, the abstract state setting unit 16 defines a proposition for representing, by a logical formula, an abstract state of an object present in the workspace Stag specified by the environment information S2. The abstract state setting unit 16 supplies information (also referred to as "abstract state setting information IS") indicating the set abstract state to the sequence generation unit 17. As will be described later, when the determination unit 15 determines that the objective task cannot be completed after the subtask sequence is generated, the abstract state setting unit 16 resets the abstract state. The process executed by the abstract state setting unit 16 according to the determination information IJ will be described later.

The sequence generation unit 17 generates a subtask sequence to be executed by the controlled device 5 based on the abstract state setting information IS supplied from the abstract state setting unit 16, the objective task specified by the input information S1, the environment information S2, and the stored information. Then, the sequence generation unit 17 transmits the control information S4 indicating at least the generated subtask sequence to the controlled device 5. The control information S4 includes information indicating the execution order and execution timing of each subtask included in the subtask sequence. The sequence generation unit 17 generates sequence information I7 indicating the generated subtask sequence, and stores the sequence information I7 in the stored information storage unit 41. Further, as will be described later, after the generation of the subtask sequence, if the determination unit 15 determines that the objective task cannot be completed, the sequence generation unit 17 regenerates the subtask sequence based on the abstract state setting information IS indicating the abstract state reset by the abstract state setting unit 16.

Each component of the determination unit 15, the abstract state setting unit 16, and the sequence generation unit 17 described in FIG. 4 can be realized, for example, by the processor 11 executing the program. More specifically, each component may be implemented by the processor 11 executing a program stored in the memory 12 or the storage device 4. In addition, the necessary programs may be recorded in any nonvolatile recording medium and installed as necessary to realize each component. Each of these components is not limited to being implemented by software using a program, and may be implemented by any combination of hardware, firmware, and software. Each of these components may also be implemented using user programmable integrated circuit, such as, for example, FPGA (field-programmable gate array) or a microcomputer. In this case, the integrated circuit may be used to realize a program to function as each of the above-described components. Thus, each component may be implemented by hardware other than the processor. The above is the same in other example embodiments to be described later.

(5) Details of First Feasibility Determination

Next, the details of the first feasibility determination executed by the determination unit 15 will be specifically described. According to the first feasibility determination, the determination unit 15 determines that the objective task cannot be completed if the accuracy or the information amount of the environment information S2 acquired at the time when the objective task is designated does not reach the accuracy or the information amount required for executing the objective task.

In this case, if the environment information S2 does not include the information, which is specified in the abstract state specification information I1 corresponding to the objective task, regarding an object for which the abstract state is to be set, the determination unit 15 determines that the accuracy or the information amount of the environment information S2 does not reach the accuracy or the amount of information necessary for executing the objective task. Further, if the determination unit 15 determines that a space serving as a blind spot from the observation device 3 exists in the workspace Stag, the determination unit 15 determines that the accuracy or the information amount of the environment information S2 does not reach the accuracy or the amount of information necessary for executing the objective task. In this case, for example, the determination unit 15 determines the presence or absence of the blind spot described above by matching the map information I9 showing a map in the workspace Stag with the environment information S2. Further, if the posture of the object to be handled by the controlled device 5 cannot be specified from the environment information S2, the determination unit 15 determines that the accuracy or the information amount of the environment information S2 does not reach the accuracy or the amount of information necessary for executing the objective task.

Next, a description will be given of a specific example of the first feasibility determination.

In the first example of the first feasibility determination, when the load transport is set as the target task, and when the observation device 3 cannot generate the environment information S2 relating to the goal position or the route to the goal position serving as the transport destination of the load, the determination unit 15 determines that the objective task cannot be completed. As described above, when the presence or absence of an obstacle or the like in the goal position or on a route to the goal position cannot be confirmed due to the lack of the accuracy or the information amount of the environment information S2, the determination unit 15 considers that an uncertain element exists in the execution of the objective task and determines that the objective task cannot be completed.

In the second example of the first feasibility determination, when the pick-and-place is the objective task and the observation device 3 cannot generate the environment information S2 relating to the position and posture of the object to be grasped by the controlled device 5 which is the robot arm, the determination unit 15 determines that the objective task cannot be completed. In the third example of the first feasibility determination, in such a case that the objective task is crop harvesting in agriculture, if the determination unit 15 determines, based on the environment information S2, that a crop is present at a position (e.g., the back side of the leaf) serving as the blind spot from the observation device 3, the determination unit 15 determines that the objective task cannot be completed. In other objective tasks relating to agriculture such as weed removal and dispersal of fertilizer, water, and/or chemicals, the determination unit 15 determines that the objective task cannot be completed if there is a possibility that there is an object to be recognized at a position (e.g., shade of leaves) serving as a blind spot from the observation device 3. In the fourth example of the first feasibility determination, in such a case that the objective task is security service, if the determination unit 15 determines, based on the environment information S2, that there is a place that cannot be observed by the observation device 3 at the present time in the space to be guarded, the determination unit 15 determines that the objective task cannot be completed.

Further, in the first feasibility determination, the determination unit 15 may determine whether or not the objective task can be completed by referring to the task execution history information I8 included in the stored information. For example, the task execution history information I8 includes a plurality of records each of which associates an objective task with the execution condition of the objective task and the result of whether or not the objective task could be executed, and the determination unit 15 searches for a record that matches the current objective task and the current execution condition of the objective task specified based on the environment information S2 and the like. If there is a record that matches the current objective task and the current execution condition of the objective task, the determination unit 15 determines whether or not the objective task can be executed by referring to the result of whether or not the objective task could be executed included in the matched record.

As described above, by referring to the task execution history information I8, the determination unit 15 can accurately determine the feasibility of the objective task according to the first feasibility determination is possible based on the execution result of the objective task in the past.

(6) Details of Second Feasibility Determination

Next, the details of the second feasibility determination executed by the determination unit 15 will be specifically described. When determining, based on at least one of the environment information S2, the state information S3, or the stored information, that at least one of the subtasks included in the subtask sequence generated by the sequence generation unit 17 cannot be executed, the determination unit 15 determines that the objective task cannot be completed.

First, an example in which the second feasibility determination is executed based on the sequence information I7 including the subtask execution condition information will be described. Based on the subtask execution condition information included in the sequence information I7, the determination unit 15 determines that the objective task cannot be completed when the controlled device 5 determines that the execution condition of at least one of the subtasks to be executed is not satisfied. In this case, for example, the determination unit 15 determines whether or not the execution conditions of all the subtasks to be executed by the controlled device 5 are satisfied. Then, if the execution condition of at least one of the subtasks is not satisfied, the determination unit 15 determines that the objective task cannot be completed. In another example, the determination unit 15 determines whether or not the execution conditions for the subtask to be executed within a predetermined time or within a predetermined step by the controlled device 5 is satisfied. Then, the determination unit 15 determines that the objective task cannot be completed if the execution condition of at least one of the subtasks is not satisfied.

Further, in the second feasibility determination, the determination unit 15 may determine, based on the state information S3, whether or not the objective task can be completed. In this case, if the determination unit 15 determines that there is an abnormality in the state of the controlled device 5 indicated by the state information S3, the determination unit 15 determines that the objective task cannot be completed. Further, by referring to the task execution history information I8 included in the stored information, the determination unit 15 may determine whether or not the objective task can be completed in the same manner as the first feasibility determination. In this case, the determination unit 15 refers to the record of the task execution history information I8 that matches the current environment and the objective task based on the environment information S2 and determines whether or not the objective task can be completed.

Next, a specific example in which the subtask cannot be executed will be described. For example, when the determination unit 15 determines, based on the environment information S2, that there are insufficient parts to be used in a certain subtask, it determines that execution of the subtask cannot be performed. In another example, in the objective task relating to cooperative work with a person, the determination unit 15 determines that the execution of the subtask cannot be performed if a certain subtask cannot be initiated by the scheduled execution time due to a delay in a human work or an unexpected human movement. In this case, based on the environment information S2, the determination unit 15 detects the presence or absence of a delayed human work or unexpected human movement that affects the scheduled execution time of the subtask. In yet another example, if the determination unit 15 detects, based on the environment information S2, an event or an object that is an obstacle in executing a certain subtask, it determines that the subtask cannot be executed.

(6) Details of Abstract State Setting Unit

Next, the setting of the abstract state of an object present in the work space Stag based on the environment information S2, the determination information IJ, and the abstract state specification information I1 will be described.

When the determination information IJ indicates a determination result relating to the first feasibility determination, the abstract state setting unit 16 sets an abstract state in the workspace Stag based on the environment information S2 and the abstract state specification information I1. Here, when the determination information IJ indicates the determination result of the first feasibility determination indicating that the objective task can be completed, the abstract state setting unit 16 considers that the environment information S2 has sufficient accuracy or sufficient amount of information to set the abstract state, and sets the abstract state based on the environment information S2 and the abstract state specification information I1. An example of setting the abstract state in this case will be described later with reference to FIG. 5.

On the other hand, when the determination information IJ indicates the determination result of the first feasibility determination indicating that the objective task cannot be completed, the abstract state setting unit 16 sets a temporary abstract state (also referred to as "temporary abstract state") within the workspace Stag to be used until the environment information S2 including the sufficient accuracy or the sufficient amount of information within the workspace Stag is obtained. When the outside range of observation that is outside the observation by the observation device 3 exists in the workspace Stag, the abstract state setting unit 16 sets the temporary abstract state within the workspace Stag by referring to the map information I9 and provisionally defining the abstract state relating to the outside range of the observation. Thus, the abstract state setting unit 16 preferably sets the temporary abstract state within the workspace Stag, even when the outside observation range is present in the workspace Stag. When there is no map information I9 or the like for temporarily setting the abstract state corresponding to the outside range of observation, the abstract state setting unit 16 may set, based on the environment information S2, a temporary abstract state only corresponding to observable range by the observation device 3 that is a part of the workspace Stag. Thereby, the abstract state setting unit 16 can suitably set the temporary abstract state required to determine the operation of the controlled device 5 for the time being even when the outside range of observation exists in the workspace Stag when the objective task is designated. In addition, even when an object for which the abstract state cannot be set due to insufficient accuracy of the environment information S2, the abstract state setting unit 16 similarly sets the temporary abstract state in the workspace Stag by temporarily setting the abstract state for the object. For example, if there is an object whose accurate posture or other state cannot be observed by the observation device 3 as an object for which an abstract state cannot be set, the abstract state setting unit 16 may set an abstract state for the object by assuming the posture of the object to be a certain posture.

When the abstract state setting unit 16 receives the environment information S2 relating to the range that was originally outside the observation from the observation device 3 after the movement of the observation device 3, the abstract state setting unit 16 sets the abstract state in the workspace Stag based on the environment information S2.

Further, when the determination information IJ indicates a determination result relating to the second feasibility determination, the abstract state setting unit 16 determines whether or not the determination information IJ indicates a determination result indicating that the objective task cannot be executed. When the determination information IJ indicates a determination result indicating that the objective task cannot be executed, the abstract state setting unit 16 resets the abstract state in the workspace Stag based on the environment information S2 generated by the observation device 3 at the present time. Hereafter, the abstract state in the workspace Stag prior to being reset based on the second feasibility determination is referred to as "first abstract state", and the abstract state in the workspace Stag reset based on the second feasibility determination is referred to as "second abstract state". Thus, when a situation in which it is predicted that the objective task cannot be completed occurs, the abstract state setting unit 16 immediately sets a second abstract state that is an abstract state newly set in accordance with the current situation. After that, the sequence generation unit 17 regenerates the subtask sequence according to the current situation based on the newly-set second abstract state.

On the other hand, when the determination information IJ indicates the determination result relating to the second feasibility determination and the determination information IJ indicates the determination result indicating that the objective task can be executed, the abstract state setting unit 16 does not reset the abstract state (i.e., does not set the second abstract state). In this case, the sequence generation unit 17 does not generate the subtask sequence and causes the controlled device 5 to continue to execute the initial subtask sequence.

Next, an example of setting the abstract state will be described. The abstract state setting unit 16 refers to the abstract state specification information I1 and recognizes an abstract state to be set in the workspace Stag. The abstract state to be set in the workspace Stag varies depending on the type of the objective task. Therefore, when the abstract state to be set is defined for each type of the objective task in the abstract state specification information I1, the abstract state setting unit 16 refers to the abstract state specification information I1 corresponding to the objective task specified by the input signal S1 and recognizes the abstract state to be set.

Figure 5:
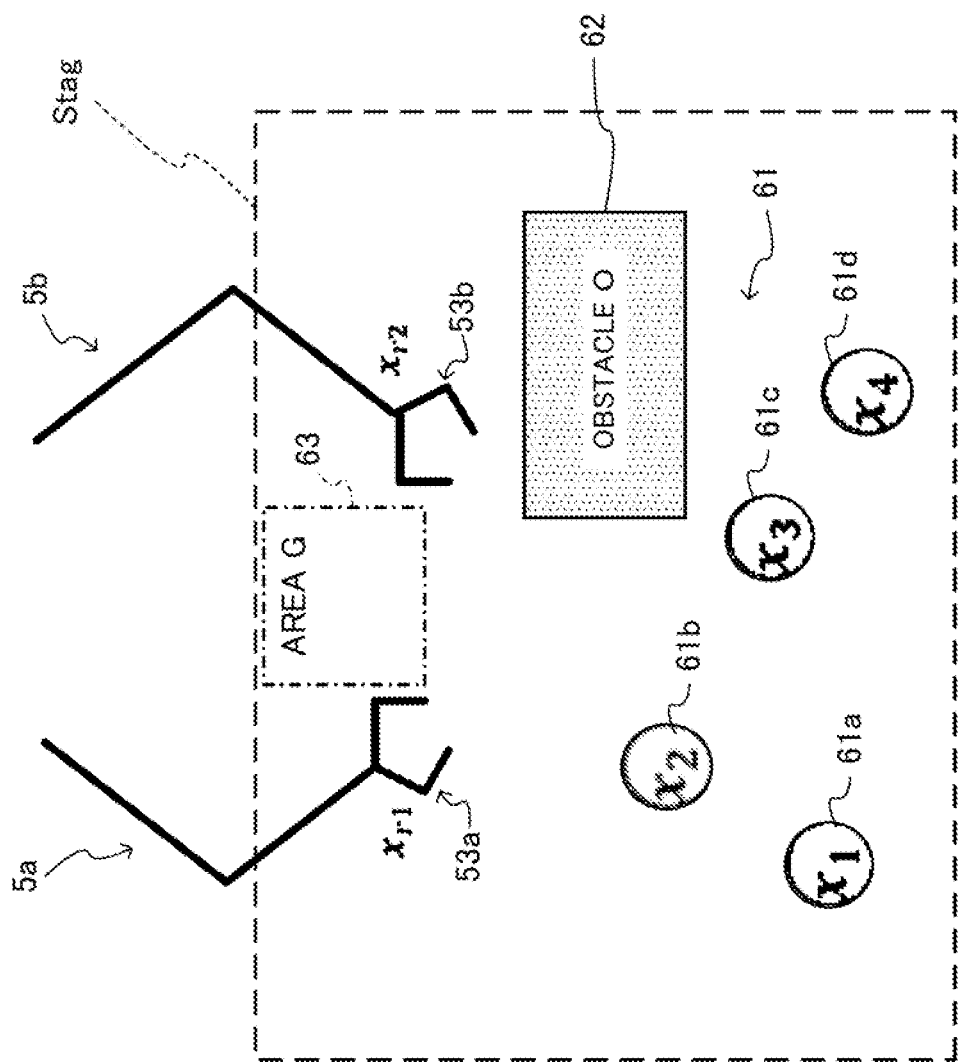
FIG. 5 illustrates a bird's-eye view of the workspace.

FIG. 5 shows a bird's-eye view of the workspace Stag when the objective task is pick-and-place. In the workspace Stag shown in FIG. 5, there are two robot arms that operate independently from each other, the controlled device 5a and the controlled device 5b, four target objects 61a to 61d, and an obstacle 62. The controlled device 5a has a robot hand 53a and the controlled device 5b has a robot hand 53b.

In this case, the abstract state setting unit 16 first recognizes, based on the environment information S2, the state of the target objects 61, the existence range of the obstacle 62, the existence range of the are G set as a goal point, and the like. Here, the abstract state setting unit 16 recognizes, based on the environment information S2, the position vectors "$x_1$" to "$x_4$" of the centers of the objects 61a to 61d as the positions of the objects 61a to 61d, respectively. Further, based on the environment information S2, the abstract state setting unit 16 recognizes the position vector "$x_{r1}$" of the robot hand 53a for grasping a target object and the position vector "$x_{r2}$" of the robot hand 53b for grasping a target object as the positions of the controlled device 5a and the controlled device 5b, respectively. Similarly, based on the environment information S2, the abstract state setting unit 16 recognizes the postures of the target objects 61a to 61d (which are not required in the example of FIG. 5 because target objects are spherical), the existence range of the obstacle 62, the existence range of the are G, and the like. For example, on the assumption that the obstacle 62 is a rectangular parallelepiped and the area G is a rectangle, the abstract state setting unit 16 recognizes, based on the environment information S2, the position vectors of vertices of the obstacle 62 and the area G.

The abstract state setting unit 16 determines the abstract state to be defined in the objective task by referring to the abstract state specification information I1. In this case, based on the environment information S2, the abstract state setting unit 16 recognizes objects and areas existing in the workspace Stag, and determines propositions indicating abstract states based on the recognition result (e.g., the number of the objects and the number of the areas for each type) and the abstract state specification information I1 relating to the objects and the areas.

In the example of FIG. 5, the abstract state setting unit 16 assigns identification labels "1" to "4" to the target objects 61a to 61d specified by the environment information S2, respectively. Further, the abstract state setting unit 16 defines a proposition "$g_i$" that the target object "i" (i=1 to 4) is present in the area G (see the broken line frame 63) that is the goal point to be finally placed. Further, the abstract state setting unit 16 defines an identification label "O" to the obstacle 62 specified by the environment information S2, and defines the proposition "$o_i$" that the target object i interferes with the obstacle O. Furthermore, the abstract state setting unit 16 defines a proposition "h" that controlled devices 5 that are robot arms interfere with each other.

Thus, by referring to the abstract state specification information I1, the abstract state setting unit 16 recognizes the abstract states to be defined, and defines the propositions representing the abstract states ($g_i$, $o_i$, h in the above-described example) according to the number of the target objects 61, the number of the controlled devices 5, the number of the obstacles 62, and the like. Then, the abstract state setting unit 16 supplies information indicating the propositions representing the abstract states to the sequence generation unit 17 as the abstract state setting information IS.

(7) Details of Sequence Generation Unit

When the abstract states of objects in the workspace Stag are set by the abstract state setting unit 16, the sequence generation unit 17 generates a subtask sequence to be executed by the controlled device 5 based on the abstract state setting information IS indicating the set abstract state, the objective task specified by the input information S1, the environment information S2, and the stored information.

Specifically, when it is determined that the objective task can be executed in the first feasibility determination, the sequence generation unit 17 generates a subtask sequence to be executed by the controlled device 5 based on the abstract state and the like set by the abstract state setting unit 16. When it is determined that the objective task cannot be executed in the first feasibility determination, the sequence generation unit 17 generates, based on the temporary abstract state set by the abstract state setting unit 16, a temporary subtask sequence (also referred to as a "temporary subtask sequence") to be used until the environment information S2 within the workspace Stag having sufficient accuracy or sufficient amount of information is obtained. For example, when the temporary abstract state is set for only a part of the range of the workspace Stag (i.e., only the observation range of the observation device 3), the sequence generation unit 17 generates a subtask sequence in which the controlled device 5 should temporarily operate within the observation range as a temporary sequence. In another example, when the temporary abstraction state for the entire workspace Stag is set, the sequence generation unit 17 generates a subtask sequence in which the controlled device 5 should temporarily operate in the workspace Stag as a temporary sequence. In the case where the controlled device 5 is provided with the function of the observation device 3, the sequence generation unit 17 may generate a subtask sequence for moving the controlled device 5 as a temporary sequence so that the controlled device 5 can measure a range in which the accuracy or the information amount of the environment information S2 is insufficient.

When it is determined that the objective task cannot be executed in the second feasibility determination, the sequence generation unit 17 generates a new subtask sequence (also referred to as "second sequence") based on the second abstract state set by the abstract state setting unit 16. As described above, when a situation in which it is determined that the objective task cannot be completed occurs during execution of the initial subtask sequence, the sequence generation unit 17 immediately generates a second sequence corresponding to the situation and causes the controlled device 5 to execute the second sequence. This minimizes the effect of work delays or the like caused by the occurrence of a situation in which it is determined that the objective task cannot be executed in the initial subtask sequence, and suitably completes the objective task. When it is determined that the objective task can be executed in the second feasibility determination, generation of the second sequence is not performed. Hereafter, the subtask sequence generated before generation of the second sequence is also referred to as "first sequence".

Next, a specific example of generating a subtask sequence will be described. In the following, as an example, a specific example of generating a subtask sequence based on temporal logic will be described.

(7-1) Functional Block

Figure 6:
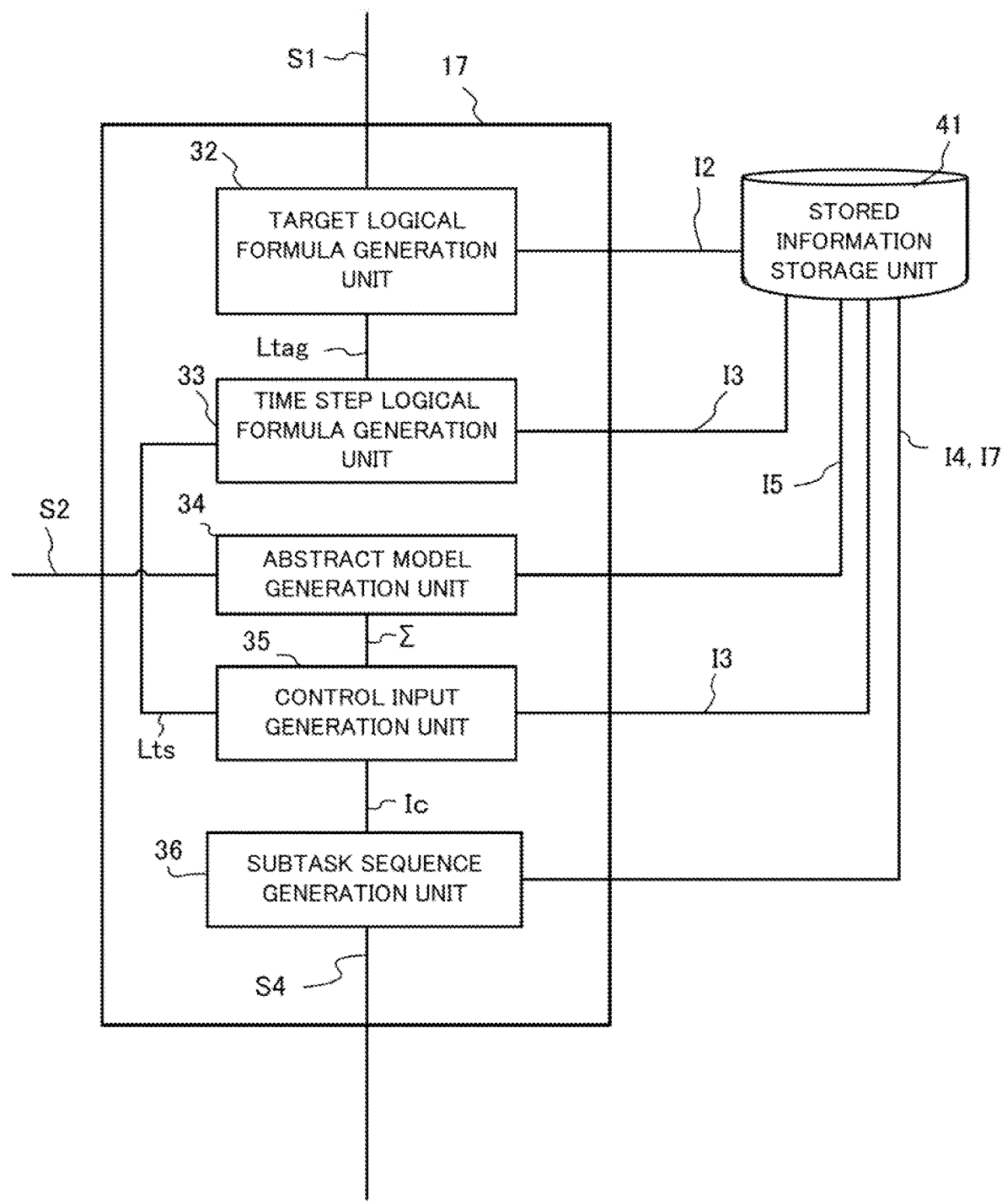
FIG. 6 is a functional block diagram of a target logical formula generation unit.

FIG. 6 is a block diagram illustrating a functional configuration of the sequence generation unit 17. The sequence generation unit 17 functionally includes a target logical formula generation unit 32, a time step logical formula generation unit 33, an abstract model generation unit 34, a control input generation unit 35, and a subtask sequence generation unit 36.

When receiving the input signal S1 relating to the objective task from the input device 2, on the basis of the abstract state setting information IS, the target logical formula generation unit 32 converts the objective task indicated by the input signal S1 into a logical formula (also referred to as a "target logical formula Ltag"), in the form of the temporal logic, representing the final state to be achieved. In this case, by referring to the constraint condition information I2 from the stored information storage unit 41, the target logical formula generation unit 32 adds the constraint conditions to be satisfied in executing the objective task to the target logical formula Ltag. Then, the target logical formula generation unit 32 supplies the generated target logical formula Ltag to the time step logical formula generation unit 33.

The time step logical formula generation unit 33 convers the target logical formula Ltag supplied from the target logical formula generation unit 32 to the logical formula (also referred to as "time step logical formula Lts") representing the state at each time step. Then, the time step logical formula generation unit 33 supplies the generated time step logical formula Lts to the control input generation unit 35.

On the basis of the environment information S2 and the abstract model information I5 stored in the stored information storage unit 41, the abstract model generation unit 34 generates an abstract model "$\Sigma$" in which the real dynamics in the workspace Stag are abstracted. In this case, the abstract model generation unit 34 considers the target dynamics as a hybrid system in which the continuous dynamics and the discrete dynamics are mixed, and generates an abstract model $\Sigma$ based on the hybrid system. The method for generating the abstract model $\Sigma$ will be described later. The abstract model generation unit 34 supplies the generated abstract model $\Sigma$ to the control input generation unit 35.

The control input generation unit 35 determines a control input for the controlled device 5 for each time step, wherein the control input optimizes the evaluation function while satisfying the time step logical formula Lts supplied from the time step logical formula generation unit 33 and the abstract model $\Sigma$ supplied from the abstract model generation unit 34. Then, the control input generation unit 35 supplies information (also referred to as "control input information Ic") indicative of the control input for the controlled device 5 for each time step to the subtask sequence generation unit 36.

The subtask sequence generation unit 36 generates a subtask sequence based on the control input information Ic supplied from the control input generation unit 35 and the subtask information I4 stored in the stored information storage unit 41, and supplies a control information S4 indicating the subtask sequence to the controlled device 5.

(7-2) Details of Target Logical Formula Generation Unit

The target logical formula generation unit 32 converts the objective task specified by the input signal S1 into a logical formula using the temporal logic. It is noted that there are various existing technologies for the method of converting tasks expressed in natural language into logical formulas. For example, in the example of FIG. 5, it is herein assumed that the objective task "the target object (i=2) is finally present in the area G" is given. In this case, the target logical formula generation unit 32 generates the logical formula "$\Diamond g_2$" which represents the objective task by using the operator "$\Diamond$" corresponding to "eventually" of the linear logical formula (LTL: Linear Temporal Logic) and the proposition "$g_i$" defined by the abstract state setting unit 31. The target logical formula generation unit 32 may express the logical formula by using any operators based on the temporal logic other than the operator "$\Diamond$" such as logical AND "$\wedge$", logical OR "$\vee$", negative "$\neg$", logical implication "$\Rightarrow$", always "$\square$", next "$\bigcirc$", until "U", etc.). The logical formula may be expressed by any temporal logic other than linear temporal logic such as MTL (Metric Temporal Logic) and STL (Signal Temporal Logic).

Next, the target logical formula generation unit 32 generates the target logical formula Ltag obtained by adding the constraint conditions indicated by the constraint condition information I2 to the logical formula indicating the objective task.

For example, provided that two constraint conditions "the controlled devices 5 always do not interfere with each other" and "the target object i does not interfere with the obstacle O" for pick-and-place are included in the constraint condition information I2, the target logical formula generation unit 32 converts these constraint conditions into logical formulas. Specifically, the constraint target logical formula generation unit 32 converts the above-described two constraint conditions into the following logical formulas by using the proposition "$o_i$" and the proposition "h" defined by the abstract state setting unit 31 according to the description relating to FIG. 5.

$$\square \neg h$$

$$\wedge_i \square \neg o_i$$

Therefore, in this case, the target logical formula generation unit 32 generates the following target logical formula Ltag obtained by adding the logical formulas of these constraint conditions to the logical formula "$\Diamond g_2$" corresponding to the objective task "the target object (i=2) is eventually present in the area G".

$$(\Diamond g_2) \wedge (\square \neg h) \wedge (\wedge_i \square \neg o_i)$$

In practice, the constraint conditions corresponding to the pick-and-place are not limited to the above-described two constraint conditions and there are other constraint conditions such as "a controlled device 5 does not interfere with the obstacle O", "controlled devices 52 do not grasp the same target object", and "target objects does not contact with each other". Such constraint conditions are also stored in the constraint condition information I2 and are reflected in the target logical formula Ltag.

(7-3) Details of Time Step Logical Formula Generation Unit

The time step logical formula generation unit 33 determines the number of time steps (also referred to as the "target time step number") for completing the objective task, and determines combinations of propositions representing the state at each time step such that the target logical formula Ltag is satisfied with the target time step number. Since the combinations are normally plural, the time step logical formula generation unit 33 generates a logical formula obtained by combining these combinations by logical OR as the time step logical formula Lts. Each of the combinations described above is a candidate of a logical formula representing a sequence of operations to be instructed to the controlled device 5, and therefore it is hereinafter also referred to as "candidate $\varphi$".

Here, a description will be given of a specific example of the processing executed by the time step logical formula generation unit 33 when the objective task "the target object (i=2) eventually exists in the area G" is set according to the description relating to FIG. 5.

In this case, the following target logical formula Ltag is supplied from the target logical formula generation unit 32 to the time step logical formula generation unit 33.

$$(\Diamond g_2) \wedge (\square \neg h) \wedge (\wedge_i \square \neg o_i)$$

In this case, the time-step logical formula generation unit 33 uses the proposition "$g_{i,k}$" that is the extended proposition "$g_i$" to include the concept of time steps. Here, the proposition "$g_{i,k}$" is the proposition that the target object i exists in the area G at the time step k. Here, when the target time step number is set to "3", the target logical formula Ltag is rewritten as follows.

$$(\Diamond g_{2,3}) \wedge (\wedge_{k=1,2,3} \square \neg h_k) \wedge (\wedge_{i,k=1,2,3} \square \neg o_i)$$

$\Diamond g_{2,3}$ can be rewritten as shown in the following expression.

$$\Diamond g_{2,3} = (\neg g_{2,1} \wedge \neg g_{2,2} \wedge g_{2,3}) \vee$$

$$(\neg g_{2,1} \wedge g_{2,2} \wedge g_{2,3}) \vee (g_{2,1} \wedge \neg g_{2,2} \wedge g_{2,3}) \vee (g_{2,1} \wedge g_{2,2} \wedge g_{2,3})$$

The target logical formula Ltag described above is represented by a logical OR ($\varphi_1 \vee \varphi_2 \vee \varphi_3 \vee \varphi_4$) of four candidates "$\varphi_1$" to "$\varphi_4$" as shown in below.

$$\varphi_1 = (\neg g_{2,1} \wedge \neg g_{2,2} \wedge g_{2,3}) \wedge (\wedge_{k=1,2,3} \square \neg h_k) \wedge (\wedge_{i,k=1,2,3} \square \neg o_{i,k})$$

$$\varphi_2 = (\neg g_{2,1} \wedge g_{2,2} \wedge g_{2,3}) \wedge (\wedge_{k=1,2,3} \square \neg h_k) \wedge (\wedge_{i,k=1,2,3} \square \neg o_{i,k})$$

$$\varphi_3 = (g_{2,1} \wedge \neg g_{2,2} \wedge g_{2,3}) \wedge (\wedge_{k=1,2,3} \square \neg h_k) \wedge (\wedge_{i,k=1,2,3} \square \neg o_{i,k})$$

$$\varphi_4 = (g_{2,1} \wedge g_{2,2} \wedge g_{2,3}) \wedge (\wedge_{k=1,2,3} \square \neg h_k) \wedge (\wedge_{i,k=1,2,3} \square \neg o_{i,k})$$

Therefore, the time-step logical formula generation unit 33 defines the logical OR of the four candidates $\varphi_1$ to $\varphi_4$ as the time-step logical formula Lts. In this case, the time step logical formula Lts is true if at least one of the four candidates $\varphi_1$ to $\varphi_4$ is true.

In some embodiments, by referring to the operation limit information I3, the time step logical formula generation unit 33 determines the feasibility with respect to each of the generated candidates and excludes one or more candidates determined to have no feasibility. For example, the time step logical formula generation unit 33 recognizes the distance that the robot hand can move per one time step based on the operation limit information I3. Further, the time step logical formula generation unit 33 recognizes the distance between the target object to be moved (i=2) and the robot hand based on the position vectors of each target object and the robot hand indicated by the environment information S2. Then, the time step logical formula generation unit 33 determines the feasibility based on these distances.

For example, the time step logical formula generation unit 33 determines that the above-described candidate $\varphi_3$ and candidate $\varphi_4$ have no feasibility if it is determined that both the robot hand 53a and the robot hand 53b are distant from the target object (i=2) by more than the movable distance per one time step. In this case, the time step logical formula generation unit 33 excludes the candidate $\varphi_3$ and the candidate $\varphi_4$ from the time step logical formula Lts. In this case, the time-step logical formula Lts is the logical OR ($\varphi$i V $\varphi$2) of the candidate $\varphi$1 and the candidate $\varphi_2$.

In this way, the time step logical formula generation unit 33 excludes the non-realizable candidates with reference to the operation limit information I3 from the time step logical formula Lts to thereby suitably reduce the processing load of the processing units at the subsequent stages.

Next, a supplementary description will be given of a method for setting the number of target time steps.

For example, the time step logical formula generation unit 33 determines the target time step number based on the prospective (expected) work time designated by the user input. In this case, the time step logical formula generation unit 33 calculates the target time step number based on the prospective work time described above and the information on the time width per time step stored in the memory 12 or the storage device 4. In another example, the time step logical formula generation unit 33 stores, in advance in the memory 12 or the storage device 4, information in which a suitable target time step number is associated with each type of objective task, and determines the target time step number in accordance with the type of objective task to be executed by referring to the information.

In some embodiments, the time step logical formula generation unit 33 sets the target time step number to a predetermined initial value. Then, the time step logical formula generation unit 33 gradually increases the target time step number until the time step logical formula Lts with which the control input generation unit 35 can determine the control input is generated. In this case, if the control input generation unit 35 ends up not being able to derive the optimal solution in the optimization process with the set target time step number, the time step logical formula generation unit 33 add a predetermined number (1 or more integers) to the target time step number.

At this time, the time step logical formula generation unit 33 may set the initial value of the target time step number to a value smaller than the number of time steps corresponding to the work time of the objective task expected by the user. Thus, the time step logical formula generation unit 33 suitably suppresses setting the unnecessarily large target time step number.

(7-4) Details of Abstract Model Generation Unit

The abstract model generation unit 34 generates the abstract model $\Sigma$ based on the environment information S2 and the abstract model information I5. Here, the information necessary for generating the abstract model $\Sigma$ is recorded in the abstract model information I5 for each type of the objective task. For example, when the objective task is pick-and-place, an abstract model in a general format that does not specify the position or number of the target objects, the position of the area where the target objects is to be placed, the number of controlled devices 5, and the like is recorded in the abstract model information I5. Then, the abstract model generation unit 34 generates the abstract model $\Sigma$ by applying the position and the number of the target objects, the position of the area where the object is to be placed, the number of controlled devices 5, and the like which are indicated by the environment information S2 to the general-purpose type of abstract model recorded in the abstract model information I5.

Here, at the time of work of the objective task by the controlled device 5, the dynamics in the workspace Stag is frequently switched. For example, in the case of pick-and-place, while the controlled device 5 that is a robot arm is gripping the target object i, the target object i can be moved. However, if the controlled device 5 is not gripping the target object i, the target object i cannot be moved.

In view of the above, in the present example embodiment, in the case of pick-and-place, the operation of grasping the target object i is abstracted by the logical variable "$\delta_i$". In this case, for example, the abstract model generation unit 34 can define the abstract model $\Sigma$ to be set for the workspace Stag shown in FIG. 5 as the following equation (1).

$$\begin{bmatrix} x_{r1} \\ x_{r2} \\ x_1 \\ \vdots \\ x_4 \end{bmatrix}_{k+1} = I \begin{bmatrix} x_{r1} \\ x_{r2} \\ x_1 \\ \vdots \\ x_4 \end{bmatrix}_k + \begin{bmatrix} I & 0 \\ 0 & I \\ \delta_{1,1}I & \delta_{2,1}I \\ \vdots & \vdots \\ \delta_{1,4}I & \delta_{2,4}I \end{bmatrix} \begin{bmatrix} u_1 \\ u_2 \end{bmatrix} \quad (1)$$

$$h_{ij_{min}}(1-\delta_i) \le h_{ij}(x) \le h_{ij_{max}}\delta_i + (\delta_i - 1)\varepsilon$$

Here, "$u_j$" indicates a control input for controlling the robot hand j ("j=1" is the robot hand 53a, "j=2" is the robot hand 53b), and "I" indicates a unit matrix. It is noted that the control input is herein assumed to be a speed as an example but it may be an acceleration. Further, "$\delta_{j,i}$" is a logical variable that is set to "1" when the robot hand j grasps the target object i and is set to "0" in other cases. Each of "$x_{r1}$" and "$x_{r2}$" indicates the position vector of the robot hand j, and each of "$x_1$" to "$x_4$" indicates the position vector of the target object i. Further, "h(x)" is a variable to be "h(x)>=0" when the robot hand exists in the vicinity of the target object to the extent that it can grasp the object, and satisfies the following relationship with the logical variable $\delta$.

$$\delta=1 \Leftrightarrow h(x) \ge 0$$

In this equation, the logical variable $\delta$ is set to 1, on the assumption that the robot hand grasps the target object if the robot hand exists in the vicinity of the target object to the extent that it can grasp the target object.

Here, the expression (1) is a difference equation showing the relationship between the state of the objects at the time step k and the state of the objects at the time step k+1. Then, in the above expression (1), since the state of the grasp is represented by a logic variable that is a discrete value, and the movement of the target objects is represented by a continuous value, the expression (1) shows a hybrid system.

The expression (1) considers not the detailed dynamics of the entire controlled device 5 but only the dynamics of the robot hand, which is the hand of the controlled device 5 that actually grasps the object. Thus, it is possible to suitably reduce the calculation amount of the optimization process by the control input generation unit 35.

Further, the abstract model information I5 includes information for deriving the difference equation according to the expression (1) from the environment information S2 and the logical variable corresponding to the operation (the operation of grasping the target object i in the case of pick-and-place) causing the dynamics to switch. Thus, even when there is a variation in the position and the number of the target objects, the area (area G in FIG. 5) where the target objects are to be placed and the number of the controlled devices 5 and the like, the abstract model generation unit 34 can determine the abstract model Σ in accordance with the environment of the target workspace Stag by combining the abstract model information I5 and the environment information S2.

It is noted that, in place of the model shown in the expression (1), the abstract model generation unit 34 may generate any other hybrid system model such as mixed logical dynamical (MLD) system, Petri nets, automaton, and their combination.

(7-5) Details of Control Input Generation Unit

The control input generation unit 35 determines the optimal control input for the controlled device 5 with respect to each time step based on the time step logical formula Lts supplied from the time step logical formula generation unit 33 and the abstract model Σ supplied from the abstract model generation unit 34. In this case, the control input generation unit 35 defines an evaluation function for the objective task and solves the optimization problem of minimizing the evaluation function with the abstract model Σ and the time step logical formula Lts which function as constraints. For example, the evaluation function is predetermined for each type of the objective task and stored in the memory 12 or the storage device 4.

For example, when the objective task is pick-and-place, the control input generation unit 35 determines the evaluation function so that the control input "$u_k$" and the distance "$d_k$" between the target object to be carried and the goal point to place the target object are minimized (i.e., the energy spent by the controlled devices 5 is minimized). The distance $d_k$ described above corresponds to the distance between the target object (i=2) and the area G when the objective task is "the target object (i=2) is eventually present in the area G".

For example, the control input generation unit 35 determines the evaluation function to be the sum of the square of the distance $d_k$ and the square of the control input $u_k$ in all time steps, and solves the constrained mixed integer optimization problem shown in the following expression (2) with the abstract model Σ and the time-step logical formula Lts (that is, the logical OR of the candidates $\varphi_i$) which function as the constraint conditions.

$$\min_u \left( \sum_{k=0}^{T} (\|d_k\|_2^2 + \|u_k\|_2^2) \right) \quad (2)$$

$$\text{s.t.} \sum$$

$$\vee \phi_i$$

Here, "T" is the number of time steps to be considered in the optimization and it may be a target time step number or may be a predetermined number smaller than the target time step number as described later. In some embodiments, the control input generation unit 35 approximates the logic variable to a continuous value (i.e., solve a continuous relaxation problem). Thereby, the control input generation unit 35 can suitably reduce the calculation amount. When STL is adopted instead of linear temporal logic (LTL), it can be described as a nonlinear optimization problem.

Further, if the target time step number is long (e.g., larger than a predetermined threshold value), the control input generation unit 35 may set the time step number T in the expression (2) used for optimization to a value (e.g., the threshold value described above) smaller than the target time step number. In this case, the control input generation unit 35 sequentially determines the control input $u_k$ by solving the optimization problem based on the expression (2), for example, every time a predetermined number of time steps elapses. Even according to this mode, it is possible to suitably reduce the computational complexity of the optimization problem by reducing the time step number T in the expression (2).

(7-6) Details of Subtask Sequence Generation Unit

The subtask sequence generation unit 36 generates a subtask sequence based on the control input information Ic supplied from the control input generation unit 35 and the subtask information I4 stored in the stored information storage unit 41. In this case, by referring to the subtask information I4, the subtask sequence generation unit 36 recognizes subtasks that the controlled device 5 can accept and converts the control input for each time step indicated by the control input information Ic into subtasks.

For example, in the subtask information I4, there are defined functions representing two subtasks, the movement (reaching) of the robot hand and the grasping by the robot hand, as subtasks that can be accepted by the controlled device 5 when the objective task is pick-and-place. In this case, the function "Move" representing the reaching is, for example, a function that uses the following three arguments (parameter): the initial state of the controlled device 5 before the function is executed; the final state of the controlled device 5 after the function is executed; and the time to be required for executing the function. In addition, the function "Grasp" representing the grasping is, for example, a function that uses the following these arguments: the state of the controlled device 5 before the function is executed; the state of the target object to be grasped before the function is executed; and the logical variable δ. Here, the function "Grasp" indicates performing a grasping operation when the logical variable δ is "1", and indicates performing a releasing operation when the logic variable δ is "0". In this case, the subtask sequence generation unit 36 determines the function "Move" based on the trajectory of the robot hand determined by the control input for each time step indicated by the control input information Ic, and determines the function "Grasp" based on the transition of the logical variable δ for each time step indicated by the control input information Ic.

Then, the subtask sequence generation unit 36 generates a subtask sequence configured by the function "Move" and the function "Grasp", and supplies a control signal S3 indicating the subtask sequence to the controlled device 5. For example, if the objective task is "the target object (i=2) is finally present in the area G", the subtask sequence generation unit 36 generates a subtask sequence of the function "Move", the function "Grasp", the function "Move", and the function "Grasp" for the robotic hand closest to the target object (i=2). In this case, the robot hand closest to the target object (i=2) moves to the position of the target object (i=2) by the function "Move", grasps the target object (i=2) by the function "Grasp", moves to the area G by the function "Move", and places the target object (i=2) in the area G by the function "Grasp".

The subtask sequence generation unit 36 generates sequence information I7 indicating the generated subtask sequence, and stores the sequence information I7 in the stored information storage unit 41. In some embodiments, at this time, the subtask sequence generation unit 36 stores, in the stored information storage unit 41, the sequence information I7 including the subtask execution condition information indicating the execution condition necessary for executing each of the subtasks included in the subtask sequence. In this case, for example, by referring to the subtask information I4, the subtask sequence generation unit 36 acquires the subtask execution condition information for each subtask included in the subtask sequence. In another example, the subtask sequence generation unit 36 may generate the subtask execution condition information for each subtask included in the subtask sequence based on the control input information Ic or the stored information such as the constraint condition information I2 and the operation limit information I3.

The method of generating the subtask sequence is not limited to the method based on the block configuration shown in FIG. 6. For example, the sequence generation unit 17 may generate a subtask sequence indicating a sequence of subtasks designated by the input device 2. In another example, the stored information includes design information of the subtask sequence designed in advance for each type of the objective task, and the operation sequence generation unit 17 may generate the subtask sequence by referring to the design information of the subtask sequence corresponding to the designated objective task. A specific example for executing a task based on a task sequence designed in advance is disclosed in JP 2017-39170A.

(8) Process Flow

Figure 7:
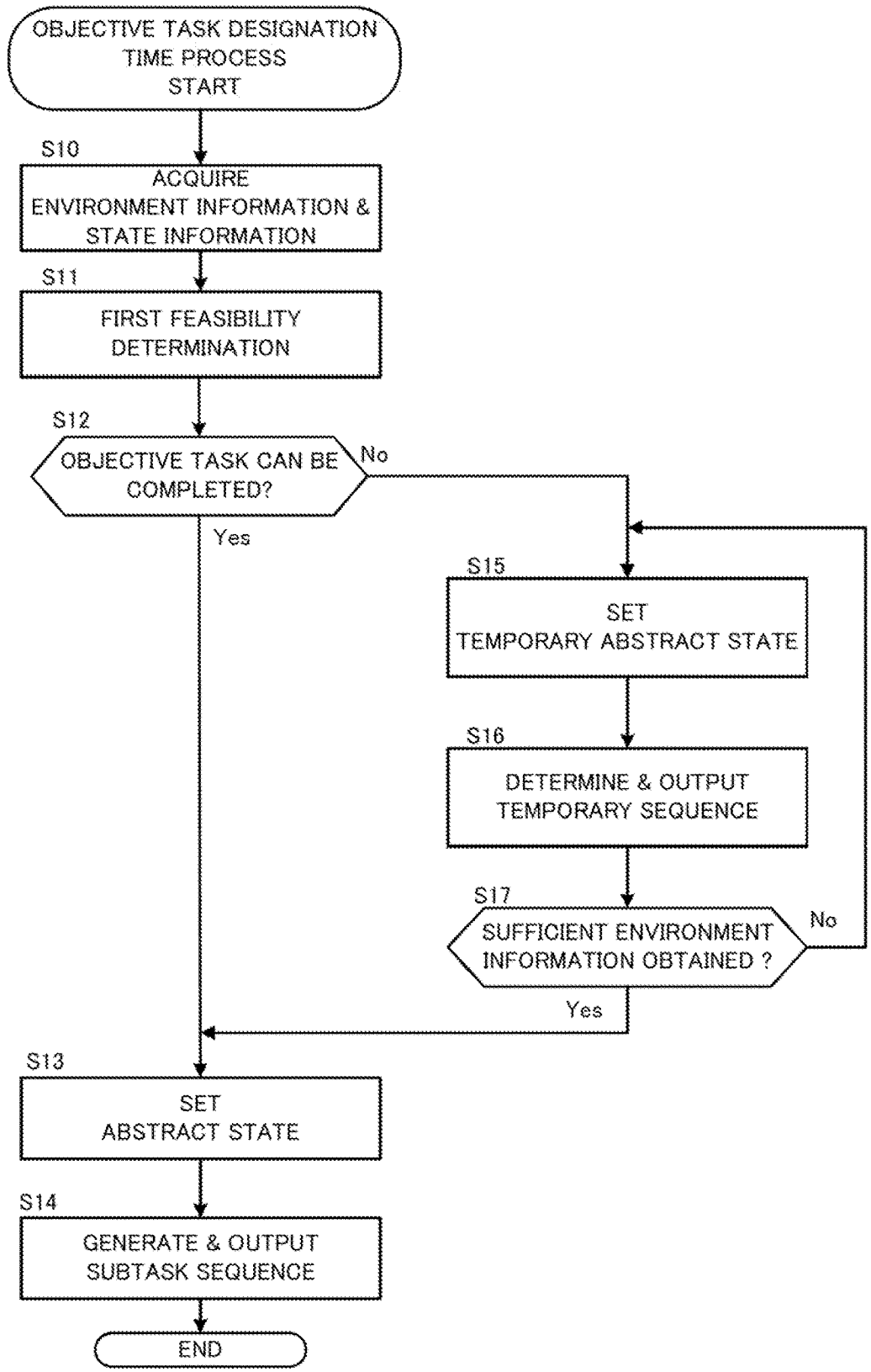
FIG. 7 illustrates an example of a flowchart showing the procedure of objective task designation time process.

FIG. 7 is an example of a flowchart illustrating a procedure of the process (also referred to as "objective task designation time process") executed by the control device 1 when the objective task is designated. The control device 1 executes the process of the flowchart shown in FIG. 7 in response to receiving the input information Si indicative of the objective task from the input device 2.

First, the control device 1 acquires the environment information S2 from the observation device 3 while acquiring the state information S3 from the controlled devices 5 (step S10). Then, the determination unit 15 of the control device 1 makes, based on the environment information S2, the first feasibility determination (step S11). In this case, the determination unit 15 determines, based on the environment information S2 and the stored information, whether or not the accuracy or the information amount of the environment information S2 reaches the accuracy or the amount of information necessary for the execution of the objective task.

If the determination unit 15 determines that the objective task can be completed according to the result of the first feasibility determination (step S12; Yes), the abstract state setting unit 16 of the control device 1 sets the abstract states of objects present in the workspace Stag (step S13). In this case, since the accuracy or the information amount of the environment information S2 satisfies the accuracy or the amount of information required for executing the objective task, the abstract state setting unit 16 can suitably set the abstract states of the objects present in the workspace Stag based on the environment information S2. The sequence generation unit 17 generates and outputs a subtask sequence to be executed by each controlled device 5 on the basis of the abstract state setting information IS indicating the abstract state set by the abstract state setting unit 16, the objective task, the environment information S2, and the stored information (step S14). In this case, the sequence generation unit 17 transmits the control information S4 indicating the subtask sequence to each controlled device 5 through the interface 13.

On the other hand, when it is determined that the objective task cannot be completed according to the result of the first feasibility determination (step S12; No), the abstract state setting unit 16 sets the temporary abstract state regarding the objects present in the workspace Stag (step S15). In this case, the abstract state setting unit 16 may set the temporary abstract state indicating abstract states of objects present within a range in which the observation device 3 can observe, or may set a temporary abstract state corresponding to the whole workspace Stag by making up for a lack of information, in the environment information S2, corresponding to a range in which the observation device 3 cannot observe by the task execution history information I8 or the map information I9.

Then, the sequence generation unit 17 generates a temporary sequence based on the temporary abstraction state set at step S15, and transmits the control information S4 indicating the temporary sequence to the controlled device 5 (step S16). Thus, the controlled device 5 temporarily starts the operation for executing the objective task on the basis of the temporary sequence indicated by the control information S4.

Thereafter, the determination unit 15 determines whether or not the environment information S2 necessary for completing the objective task can be acquired (step S17). If the environment information S2 required for completing the objective task is acquired (step S17; Yes), the control device 1 performs the process at step S13 and step S14 to set the abstract state in the workspace Stag and generate and output a subtask sequence. Thereby, the controlled device 5 can perform the operation necessary for executing the objective task on the basis of the subtask sequence indicated by the control information S4 outputted from the control device 1. On the other hand, if the environment information S2 necessary for completing the objective task cannot be acquired (step S17; No), the process returns to step S15. Thus, the control device 1 repeatedly performs the process of setting the temporary abstract state, generating the temporary sequence, and transmitting the control information S4 indicating the temporary sequence to the controlled device 5 until the environment information S2 necessary for completing the objective task can be acquired. Thereby, the control device 1 causes the controlled device 5 to temporarily execute the operation for executing the objective task until the environment information S2 necessary for completing the objective task can be acquired.

Figure 8:
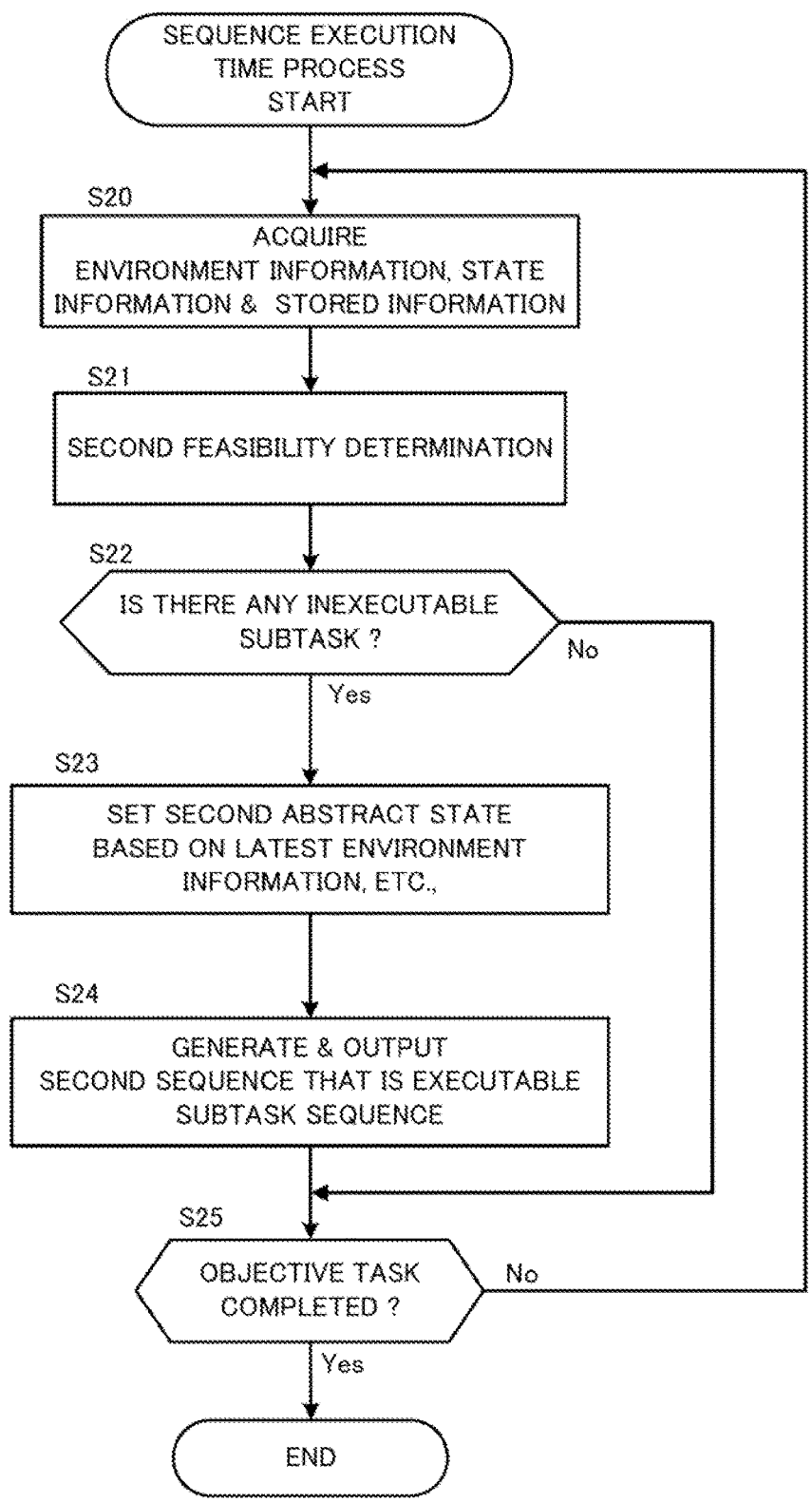
FIG. 8 illustrates an example of a flowchart showing the procedure of sequence execution time process.

FIG. 8 is an example of a flowchart illustrating a procedure of a process (also referred to as "sequence execution time process") performed by the control device 1 after the execution of the process at step S13 and step S14 in FIG. 7. The control device 1 executes the process according to the flowchart shown in FIG. 8 after the execution of the process at step S13 and step S14 in FIG. 7.

First, the determination unit 15 of the control device 1 acquires, via the interface 13, the environment information S2 generated by the observation device 3 at the present time, the state information S3 generated by the controlled devices 5, and the stored information necessary for the second feasibility determination to be described later (step S20). In this case, the determination unit 15 acquires the sequence information I7 or the task execution history information I8 as the stored information necessary for the second feasibility determination. Then, the determination unit 15 of the control device 1 makes the second feasibility determination based on the environment information S2 acquired at step S20, the state information S3, and the stored information (step S21). In this case, the determination unit 15 determines whether or not each subtask included in the subtask sequence generated at step S14 by the sequence generation unit 17 can be executed.

If the determination unit 15 determines that there is an inexecutable subtask that cannot be executed as a result of the second feasibility determination (step S22; Yes), the abstract state setting unit 16 sets, on the basis of the latest environment information S2 (i.e., the environment information S2 acquired at step S20) or the like, the second abstract state that is the latest abstract state relating to the objects present in the workspace Stag (step S23). In this case, the abstract state setting unit 16 sets a second abstract state in which the state of occurrence of an obstacle which did not exist in the workspace Stag at the initial planning and/or the state of the lack of components required for processing the subtask are reflected if these states occur. Then, the sequence generation unit 17 generates and outputs, based on the second abstract state generated at step S23, the second sequence configured by subtasks executable at the present time in order to execute the objective task. In this case, the sequence generation unit 17 transmits the control information S4 indicating the second sequence to the controlled device 5. By executing the second sequence configured by subtasks that can be executed at the present time, the controlled device 5 can promptly execute the objective task while suitably dealing with an unexpected situation.

Then, after the process at step S24, or when the determination unit 15 determines at step S22 that there is no inexecutable subtask that cannot be executed (step S22; No), the control device 1 determines whether or not the objective task is completed (step S25). In this case, if the control device 1 confirms, based on the environment information S2, the completion of the objective task in the workspace Stag, the control device 1 determines that the objective task has been completed. In another example, when the control device 1 receives a signal indicating that the objective task has been completed from the controlled device 5, it determines that the objective task has been completed. Then, if the objective task is completed (step S25; Yes), the control device 1 ends the process of the flowchart. On the other hand, when the objective task is not completed (step S25; No), the control device 1 returns the process to step S20.

(9) APPLICATION EXAMPLES

Next, a description will be given of application examples based on the first example embodiment.

(9-1) First Application Example

Figure 9:
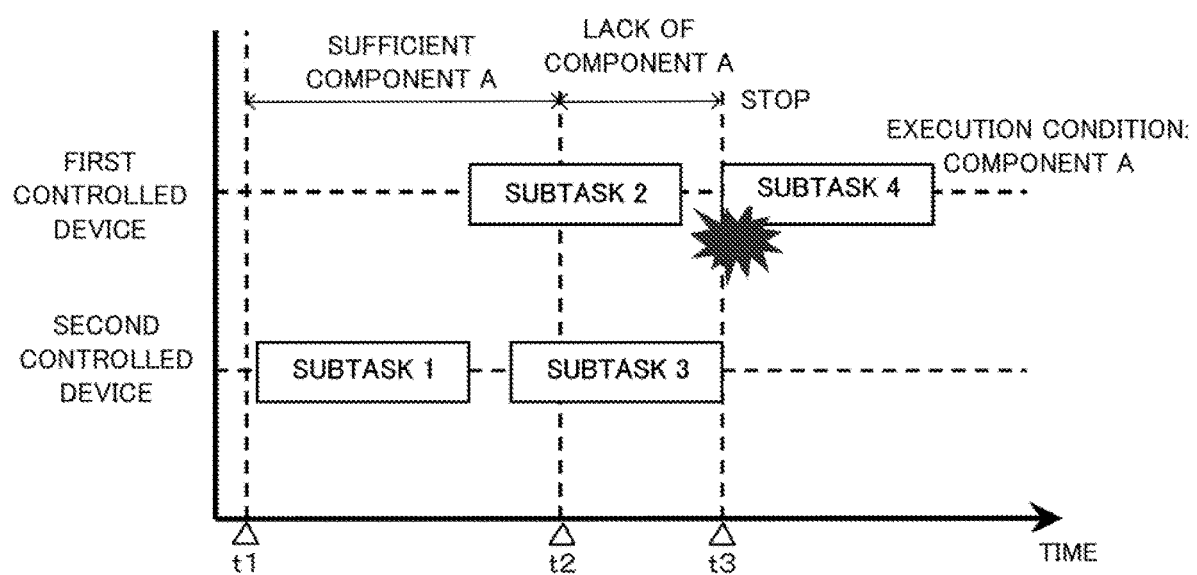
FIG. 9 illustrates an overview in the first application example of the subtask sequence, generated when the objective task is set, for each controlled device.

The first application example is an example in an assembly factory in which assembling a product is set as the objective task, and relates to the sequence execution time process shown in FIG. 8. FIG. 9 illustrates an outline of a subtask sequence, for each of the controlled devices 5, generated when the objective task is set in the first application example.

In the first application example, the first controlled device and the second controlled device are present as the controlled devices 5. Then, the control device 1 detects the execution instruction of the objective task at the time "t1". Then, on the basis of the process at step S14 in FIG. 7, the control device 1 generates a subtask sequence in which the subtask 2 and the subtask 4 are sequentially defined for the first controlled device while generating a subtask sequence in which the subtask 1 and the subtask 3 are sequentially defined for the second controlled device. Each subtask sequence described above corresponds to a first sequence.

Then, at the time "t2" after the time t1, the component A necessary for executing the subtask 4 runs short due to some accident or the like. Therefore, if the first controlled device and the second controlled device continued processing based on the first example embodiment in the original subtask sequence without executing the second feasibility determination, the first controlled device would determine, at the execution start time "t3" of the subtask 4, that there is no component A necessary for the subtask 4. Therefore, in this case, the first controlled device would determine that the subtask 4 cannot be executed and stop. Thus, if the second feasibility determination were not executed, the process would stop without completing the objective task.

Figure 10:
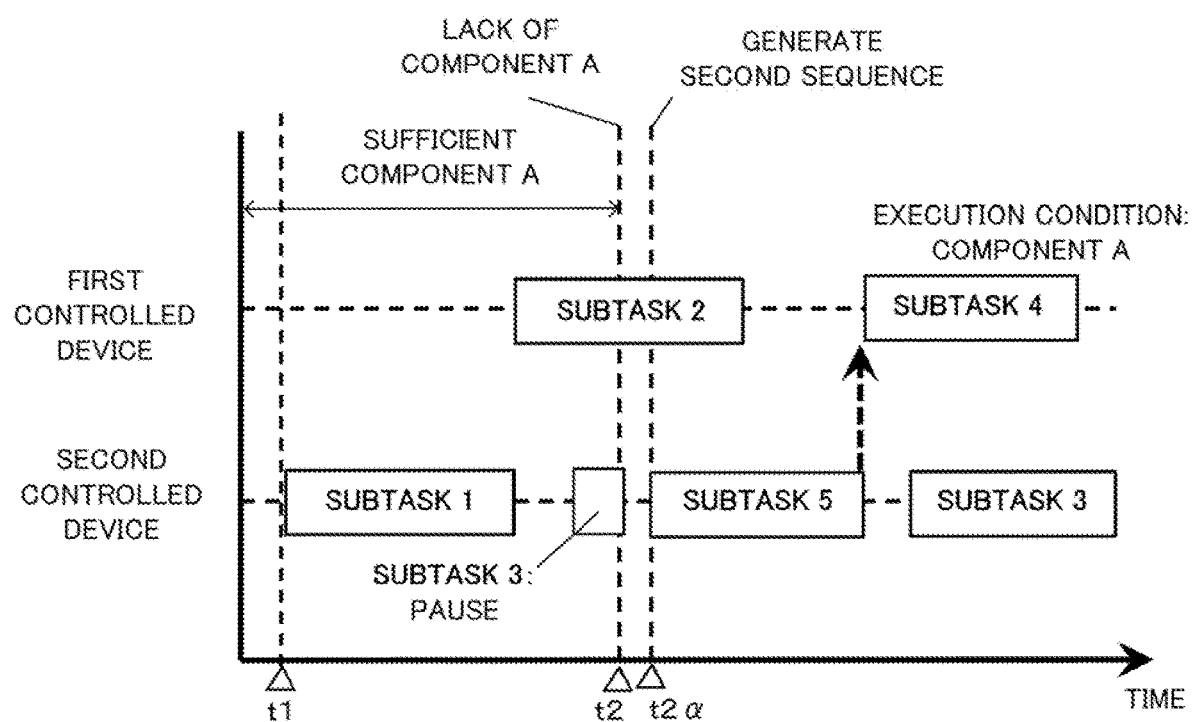
FIG. 10 illustrates an overview in the first application example of the subtask sequence in which the second sequence is reflected.

FIG. 10 is a diagram illustrating an outline of a subtask sequence in which the second sequence is reflected in the first application example. In FIG. 10, the second sequence generated based on the second feasibility determination by the control device 1 is reflected.

In this case, the control device 1 makes, based on the sequence execution time process shown in FIG. 8, the second feasibility determination after the time t1 at which the first subtask sequence is generated. Here, the control device 1 refers to the environment information S2 and the subtask execution condition information corresponding to the subtasks 1 to 4 included in the sequence information I7 in the stored information, and determines whether or not there is any inexecutable subtask that cannot be executed. When the component A runs short at the time t2, the control device 1 determines that the subtask 3 cannot be executed based on the subtask execution condition information indicating that the component A is necessary in the subtask 4 and the environment information S2 indicating the presence/absence of the component A.

Therefore, in this case, the control device 1 sets, based on the process at step S23 shown in FIG. 8, the second abstract state based on the latest environment information S2 and the like. Here, the control device 1 sets, at step S23, the abstract state of the component A as "nothing (or not arriving by a specified time)". Further, at step S23, the control device 1 appropriately sets the presence/absence regarding the state of other components and the abstract state (including whether or not to interrupt a subtask during execution) of the first controlled device and the second controlled device.

Furthermore, at the time "t2α", the control device 1 generates, based on the set second abstract state according to step S24, the second sequence which is a sequence of subtasks executable at the present time. In the example shown in FIG. 10, the control device 1 generates a second sequence of the second controlled device that interrupts the subtask 3, which causes no trouble even if it is interrupted at the present time, of the second controlled device and that includes a subtask 5 for supplying the component A to the first controlled device. Further, the control device 1 generates the second sequence of the first controlled device in which the start time of the subtask 4 is changed to the time after the scheduled completion time of the subtask 5 (i.e., after the supply of the component A to the first controlled device). Then, the control device 1 supplies the control information S4 indicating the second sequence generated at time t2α, immediately to the first controlled device and the second controlled device.

It is noted that the control information S4 transmitted to the first controlled device and the second controlled device may individually indicate subtasks to be executed by each of the first controlled device and the second controlled device, or may indicate subtasks relating to both the first controlled device and the second controlled device. The latter control information S4 includes information for specifying the executor (i.e., either of the first controlled device and the second controlled device) of each subtask.

Thus, in the first application, by generating the second sequence based on the result of the second feasibility determination, it is possible to automatically complete the objective task without stopping the process even when the environment in the working space Stag is dynamically changed.

(7-2) Second Application Example

Figure 11:
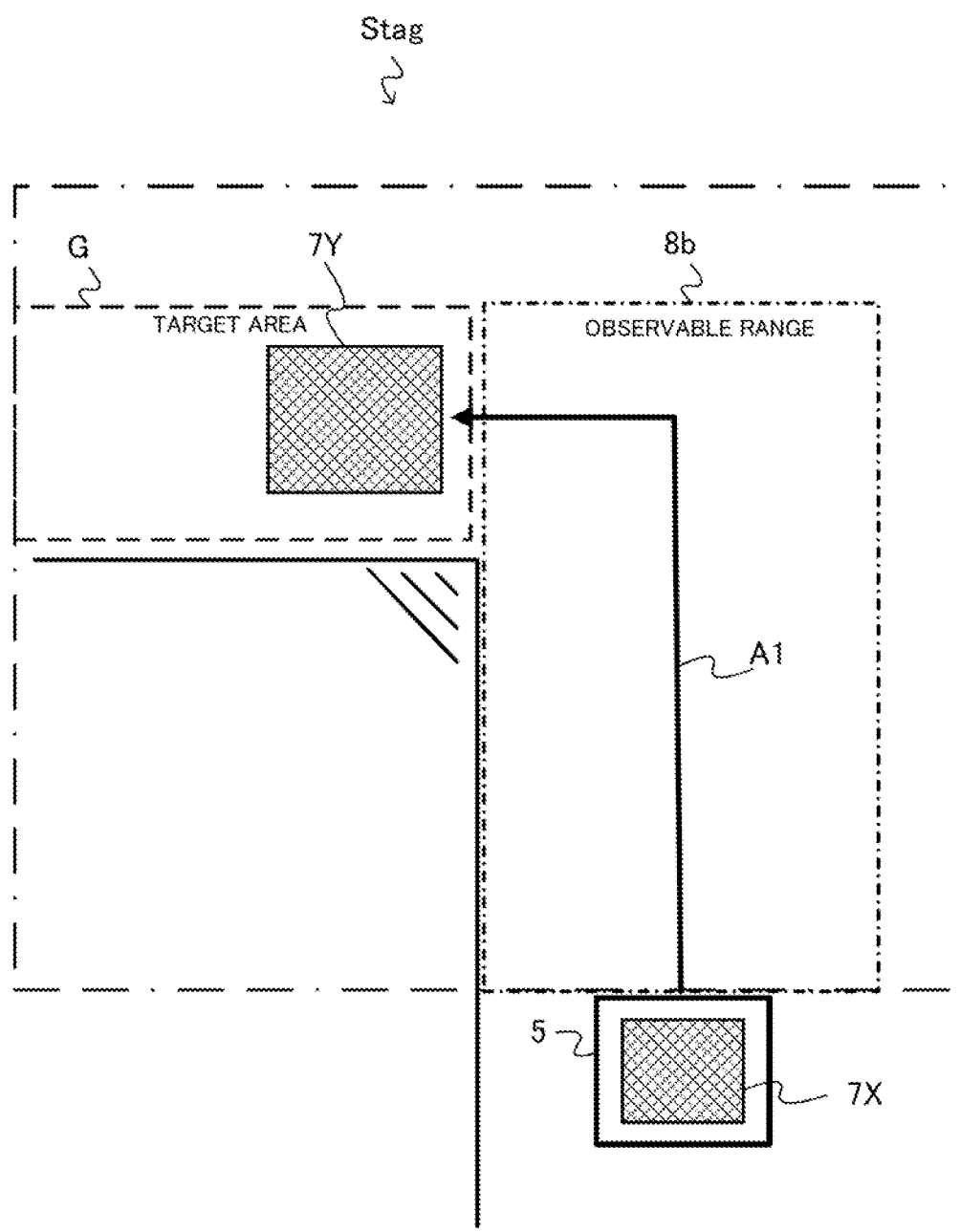
FIG. 11 illustrates a bird's-eye view of the workspace in the second application example.

The second application example is an example in which transporting a load is set as the objective task, and relates to the objective task designation time process shown in FIG. 7. FIG. 11 shows a bird's-eye view of the workspace Stag in the second application example.

In the second application, the controlled device 5 is an automatic guided vehicle (AGV: Automatic Guided Vehicle) and is equipped with one or more external sensors to thereby function as the observation device 3. Here, it is assumed that the control device 1 receives the designation of the objective task of transporting the load 7X into the target area G by the controlled device 5.

In this case, first, the controlled device 5 functioning as an observation device 3 generates a state information S3 indicating the state of the current position and posture of the environment information S2 and the controlled device 5 with respect to the observable range 8b, and supplies it to the control device 1. In this case, the control device 1 receives the environment information S2 and the state information S3 from the controlled device 5, and makes the first feasibility determination based on step S11 in FIG. 7. Here, the control device 1 determines that the environment information S2 does not include the information on the target area G and that the amount of information necessary for completing the objective task is insufficient in the environment information S2, and therefore, at step S15 and step S16, sets the temporary abstract state and generates the temporary sequence.

In the first example of the process at step S15 and step S16, the control device 1 sets the abstract state within the observable range 8b based on the environment information S2 and sets the abstract state in the workspace Stag, including the target area G, other than the observable range 8b by referring to the task execution history information I8 or the map information I9. Then, the control device 1 generates, based on the temporary abstraction state, a temporary sequence for moving the controlled device 5 to the target area G. In the second example of the process at step S15 and step S16, the control device 1 sets, based on the environment information S2, a temporary abstract state targeting the observable range 8b which is a part of the workspace Stag. Then, the control device 1 generates, based on the temporary abstraction state, a temporary sequence for the controlled device 5 to move within the observable range 8b along the arrow "A1" to approach the target area G.

Figure 12:
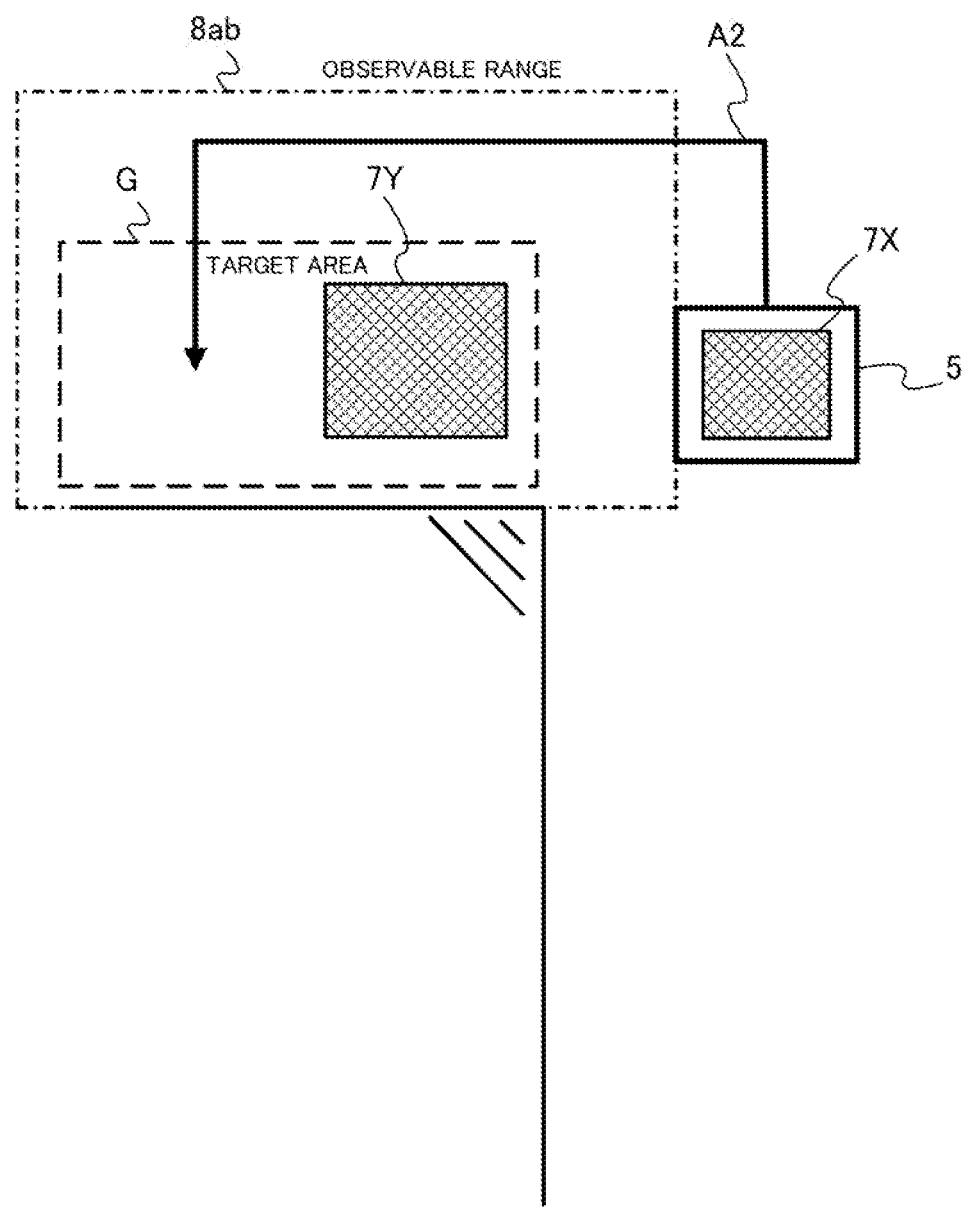
FIG. 12 illustrates a bird's-eye view of the workspace in the second application example when the controlled device moves based on the temporary sequence.

FIG. 12 shows a bird's-eye view of the workspace Stag in the second application when the controlled device 5 moves based on the control information S4 indicating the temporary sequence. In the example shown in FIG. 12, the controlled device 5 has moved to a position where the target area G is observable based on the control information S4 indicating the temporary sequence supplied from the control device 1. Therefore, the observable range Bab of the controlled device 5 includes the target area G, and the other load 7Y that is already present in the target area G is observed by the controlled device 5.

In this case, after receiving the environment information S2 supplied from the controlled device 5, the control device 1 determines, at step S17, that the necessary environment information S2 can be obtained. Therefore, in this case, at step S13, the control device 1 sets an abstract state or the like of the other load 7Y existing in the target area G on the basis of the environment information S2. Then, at step S14, the control device 1 generates a subtask sequence for moving along an arrow "A2" so as to avoid other load 7Y, and supplies control information S4 indicating the subtask sequence to the controlled device 5. Thus, the controlled device 5 moves along the arrow A2 based on the control information S4, and transports the load 7X in the target area G.

Thus, in the second application example, even when the environment information S2 is insufficient at the time of generating the first subtask sequence, the control device 1 controls the controlled device 5 by setting the temporary abstract state and the temporary sequence, and sets the abstract state and the subtask sequence when sufficient environment information S2 is obtained. Thereby, it is possible to suitably execute the objective task.

In addition to the first application example and the second application example, even when a person (a worker) and the controlled device 5 cooperate to execute the objective task, the control device 1 may set the abstract state and the subtask sequence based on the first feasibility determination or the second feasibility determination according to the first example embodiment.

For example, for the subtask sequence of the controlled device 5 and the worker's work sequence that was initially planned, there is a case that the progress of the worker's work sequence is delayed from the schedule or there is a case that the worker performs a work contrary to the work sequence. In such cases, the control device 1 recognizes the environment in the workspace Stag based on the environment information S2, and makes the second feasibility determination. Then, the control device 1 sets the second abstract state in the workspace Stag when it is determined that a subtask to be executed by the controlled device 5 or work to be executed by the worker cannot be executed as planned. Then, the control device 1 generates a second sequence which is a sequence of subtasks to be executed by the controlled device 5 or work to be executed by the worker based on the set second abstract state. The control device 1 notifies the worker of the second sequence indicating the worker's work sequence by any notification method. In this case, the control device 1 notifies the worker of the replanned work sequence by transmitting a predetermined control signal to a speaker, a display or a light generator which are not shown.

Second Example Embodiment

Figure 13:
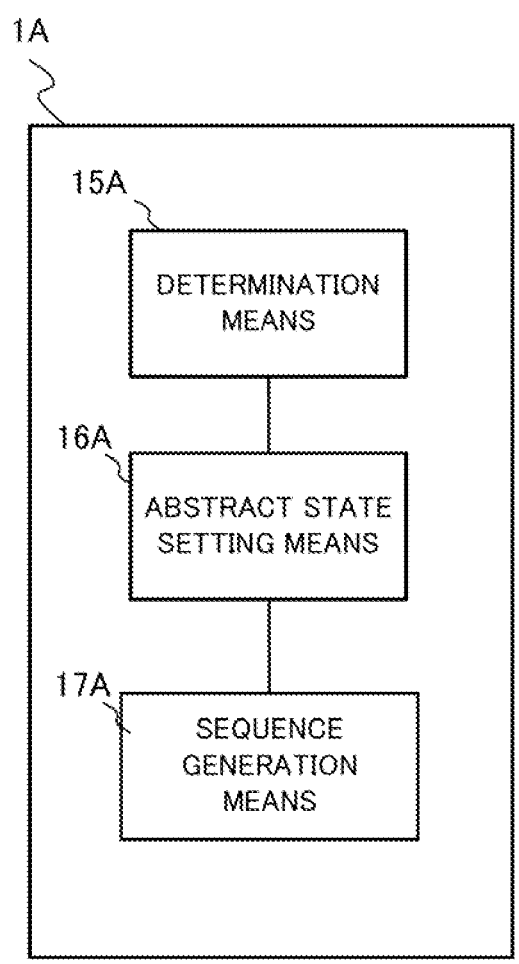
FIG. 13 illustrates a schematic configuration diagram of a control device in the second example embodiment.

FIG. 13 is a schematic configuration diagram of a control device 1A in the second example embodiment. As shown in FIG. 13, the control device 1A mainly includes a determination means 15A, an abstract state setting means 16A, and a sequence generation means 17A.

The determination means 15A is configured to determine, based on at least one of environment information relating to environment observed in a workspace of a controlled device to be controlled, state information relating to a state of the controlled device, and stored information that is stored information relating to the objective task to be executed by the controlled device, whether or not the objective task can be completed. In this case, examples of the determination means 15A include the determination unit 15 according to the first example embodiment configured to execute at least one of the first feasibility determination or the second feasibility determination. Further, examples of the "controlled device" include the controlled device 5 according to the first example embodiment, and examples of the "environment information" include the environment information S2 according to the first example embodiment. Examples of the "state information" include the state information S3 according to the first example embodiment, and examples of the stored information include the stored information stored in the stored information storage unit 41 according to the first example embodiment.

The abstract state setting means 16A is configured to set, if it is determined that the objective task cannot be completed, an abstract state in the workspace based on at least one of the environment information or the stored information. In this case, examples of the abstract state setting means 16A may be an abstract state setting unit 16 according to the first example embodiment configured to execute at least one of the process at step S15 in FIG. 7 or at step S23 in FIG. 8. Further, the term "abstract state" herein includes a temporary abstract state and a second abstract state according to the first example embodiment.

The sequence generation means 17A is configured to generate, based on the abstract state and the objective task, a sequence of subtasks to be executed by the controlled device. In this case, examples of the sequence generation means 17A include the sequence generation unit 17 according to the first example embodiment configured to execute at least one of the process at step S16 in FIG. 7 or the process at step S24 in FIG. 8. Further, examples of the "sequence of subtasks to be executed by the controlled device" include the temporary sequence or the second sequence according to the first example embodiment.

FIG. 14 is an example of the flowchart executed by the control device 1A in the second example embodiment.

First, the determination unit 15A of the control device 1A is configured to determine, based on at least one of environment information relating to environment observed in a workspace of a controlled device to be controlled, state information relating to a state of the controlled device, and stored information that is stored information relating to the objective task to be executed by the controlled device, whether or not the objective task can be completed (step S30). Next, the abstract state setting means 16A is configured to set, if it is determined that the objective task cannot be completed, an abstract state in the workspace based on at least one of the environment information or the stored information (step S31). Then, the sequence generation means 17A is configured to generate, based on the abstract state and the objective task, a sequence of subtasks to be executed by the controlled device (step S32).

According to the second example embodiment, when it is determined that the objective task cannot be completed, the control device 1A can suitably generate a sequence of subtasks to be executed by a controlled device.

In the example embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments described above can be described as, but not limited to, the following Supplementary Notes.

Supplementary Note 1

A control device comprising:
a determination means configured to determine,
based on at least one of environment information relating to environment observed in a workspace of a controlled device to be controlled, state information relating to a state of the controlled device, and stored information that is stored information relating to the objective task to be executed by the controlled device,
whether or not the objective task can be completed;
an abstract state setting means configured to set, if it is determined that the objective task cannot be completed, an abstract state in the workspace based on at least one of the environment information or the stored information; and
a sequence generation means configured to generate, based on the abstract state and the objective task, a sequence of subtasks to be executed by the controlled device.

Supplementary Note 2

The control device according to Supplementary Note 1,
wherein, at a time when the objective task is designated, the abstract state setting means is configured to set, based on at least one of the environment information or the stored information, a first abstract state that is an abstract state in the workspace,
wherein, at the time when the objective task is designated, the sequence generating means is configured to generate, based on the first abstract state and the objective task, a first sequence of subtasks to be executed by the controlled device, and wherein, during execution of the first sequence by the controlled device, the determination means is configured to determine that the objective task cannot be completed if it is determined,
based on at least one of
the environment information,
the state information, and
the stored information,
that at least one of subtasks included in the first sequence cannot be executed.

Supplementary Note 3

The control device according to Supplementary Note 2,
wherein the stored information includes subtask execution condition information indicating an execution condition of each of the subtasks included in the first sequence, and
wherein the determination means is configured to determine, based on the subtask execution condition information, a feasibility of each of the subtasks included in the first sequence.

Supplementary Note 4

The control device according to Supplementary Note 2 or 3,
wherein, if it is determined that the at least one of the subtasks cannot be executed, the abstract state setting means is configured to set,
based on the environment information at a time of determination that the at least one of the subtasks cannot be executed,
a second abstract state that is an abstract state in the workspace, and
wherein the sequence generation means is configured to generate, based on the second abstract state and the objective task, a second sequence of subtasks to be executed by the controlled device.

Supplementary Note 5

The control device according to Supplementary Note 1,
wherein the determination means is configured to determine that the objective task cannot be completed if it is determined that an accuracy or an information amount of the environment information observed at a time when the objective task is designated does not reach an accuracy or an amount of information necessary for executing the objective task.

Supplementary Note 6

The control device according to Supplementary Note 5,
wherein the abstract state setting means is configured to set,
based on at least one of the environment information or the stored information which are acquired at the time when the objective task is designated,
a temporary abstract state that is the abstract state to be temporarily used, and
wherein the sequence generation means is configured to generate,
based on the temporary abstract state and the objective task,
a temporary sequence that is a temporary sequence of subtasks to be executed by the controlled device.

Supplementary Note 7

The control device according to Supplementary Note 6,
wherein the abstract state setting means is configured to set, based on the environment information at the time when the objective task is designated, the temporary abstract state within a range in which the accuracy or the information amount of the environment information reaches the accuracy or the amount of information necessary for executing the objective task.

Supplementary Note 8

The control device according to Supplementary Note 6 or 7,
wherein the abstract state setting means is configured to set, based on the stored information, the temporary abstract state within a range in which the accuracy or the information amount of the environment information does not reach the accuracy or the amount of information necessary for executing the objective task.

Supplementary Note 9

The control device according to Supplementary Note 8,
wherein the stored information is task execution history information indicative of a past execution history of the objective task or map information indicative of a map in the workspace, and
wherein the abstract state setting means is configured to set the temporal abstract state based on at least one of the task execution history information or the map information if it is determined that the accuracy or the information amount of the environment information does not reach the accuracy or the amount of information necessary for executing the objective task.

Supplementary Note 10

The control device according to any one of Supplementary Notes 6 to 9,
wherein the abstract state setting means is configured to set, based on the environment information, the abstract state that is an abstract state in the workspace in a case of acquiring the environment information having an accuracy and information amount necessary for the executing the objective task, and
wherein the sequence generation means is configured to generate, based on the abstract state and the objective task, a second sequence of subtasks to be executed by the controlled device.

Supplementary Note 11

The control device according to any one of Supplementary Notes 1 to 10,
wherein the sequence generation means comprises:
a logical formula conversion means configured to convert the object task into a logical formula based on temporal logic;
a time step logical formula generation means configured to generate a time step logical formula that is a logical formula representing a state at each time step for executing the objective task,
a subtask sequence generation means configured to generate the sequence based on the time step logical formula.

Supplementary Note 12

A control method executed by a computer, the control method comprising:
  determining,
    based on at least one of environment information relating to environment observed in a workspace of a controlled device to be controlled, state information relating to a state of the controlled device, and stored information that is stored information relating to the objective task to be executed by the controlled device,
  whether or not the objective task can be completed;
  setting, when it is determined that the objective task cannot be completed, an abstract state in the workspace based on at least one of the environment information or the stored information; and
  generating, based on the abstract state and the objective task, a sequence of subtasks to be executed by the controlled device.

Supplementary Note 13

A storage medium storing a program executed by a computer, the program causing the computer to function as:
  a determination means configured to determine,
    based on at least one of environment information relating to environment observed in a workspace of a controlled device to be controlled, state information relating to a state of the controlled device, and stored information that is stored information relating to the objective task to be executed by the controlled device,
  whether or not the objective task can be completed;
  an abstract state setting means configured to set, if it is determined that the objective task cannot be completed, an abstract state in the workspace based on at least one of the environment information or the stored information; and
  a sequence generation means configured to generate, based on the abstract state and the objective task, a sequence of subtasks to be executed by the controlled device.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1A Control device
2 Input device
3 Observation device
4 Storage device
5, 5a, 5b Controlled device
41 Stored information storage unit
100 Task execution system

What is claimed is:

1. A control device comprising:
  at least one memory storing instructions; and
  at least one processor configured to execute the instructions to:
    upon receiving a designation of an objective task to be executed by a controlled device, and in advance of setting a sequence of subtasks into which an objective task is decomposed, determine,
      based on at least one of environment information relating to an environment observed in a workspace of the controlled device, state information relating to a state of the controlled device, and stored information that relating to the objective task to be executed by the controlled device,
    whether or not the objective task can be completed;
    set, if it is determined that the objective task cannot be completed, an abstract state in the workspace as propositions to express the objective task as a logical formula based on at least one of the environment information or the stored information;
    generate, based on the abstract state and the objective task, the sequence of subtasks to be executed by the controlled device; and
    control the controlled device by transmitting a control signal including the sequence of subtasks to the controlled device.

2. The control device according to claim 1,
  wherein, at a time when the objective task is designated, the at least one processor is configured to execute the instructions to set, based on at least one of the environment information or the stored information, a first abstract state that is an abstract state in the workspace,
  wherein, at the time when the objective task is designated, the at least one processor is configured to execute the instructions to generate, based on the first abstract state and the objective task, a first sequence of subtasks to be executed by the controlled device, and
  wherein, during execution of the first sequence by the controlled device, the at least one processor is configured to execute the instructions to determine that the objective task cannot be completed if it is determined, based on at least one of
    the environment information,
    the state information, and
    the stored information,
  that at least one of subtasks included in the first sequence cannot be executed.

3. The control device according to claim 2,
  wherein the stored information includes subtask execution condition information indicating an execution condition of each of the subtasks included in the first sequence, and
  wherein the at least one processor is configured to execute the instructions to determine, based on the subtask execution condition information, a feasibility of each of the subtasks included in the first sequence.

4. The control device according to claim 2,
  wherein, if it is determined that the at least one of the subtasks cannot be executed, the at least one processor is configured to execute the instructions to set,
    based on the environment information at a time of determination that the at least one of the subtasks cannot be executed,
    a second abstract state that is an abstract state in the workspace, and
  wherein the at least one processor is configured to execute the instructions to generate, based on the second abstract state and the objective task, a second sequence of subtasks to be executed by the controlled device.

5. The control device according to claim 1,
wherein the at least one processor is configured to execute the instructions to determine that the objective task cannot be completed if it is determined that an accuracy or an information amount of the environment information observed at a time when the objective task is designated does not reach an accuracy or an amount of information necessary for executing the objective task.

6. The control device according to claim 5,
wherein the at least one processor is configured to execute the instructions to set,
based on at least one of the environment information or the stored information which are acquired at the time when the objective task is designated,
a temporary abstract state that is the abstract state to be temporarily used, and
wherein the at least one processor is configured to execute the instructions to generate,
based on the temporary abstract state and the objective task,
a temporary sequence that is a temporary sequence of subtasks to be executed by the controlled device.

7. The control device according to claim 6,
wherein the at least one processor is configured to execute the instructions to set, based on the environment information at the time when the objective task is designated, the temporary abstract state within a range in which the accuracy or the information amount of the environment information reaches the accuracy or the amount of information necessary for executing the objective task.

8. The control device according to claim 6,
wherein the at least one processor is configured to execute the instructions to set, based on the stored information, the temporary abstract state within a range in which the accuracy or the information amount of the environment information does not reach the accuracy or the amount of information necessary for executing the objective task.

9. The control device according to claim 8,
wherein the stored information is task execution history information indicative of a past execution history of the objective task or map information indicative of a map in the workspace, and
wherein the at least one processor is configured to execute the instructions to set the temporal abstract state based on at least one of the task execution history information or the map information if it is determined that the accuracy or the information amount of the environment information does not reach the accuracy or the amount of information necessary for executing the objective task.

10. The control device according to claim 6,
wherein the at least one processor is configured to execute the instructions to set, based on the environment information, the abstract state that is an abstract state in the workspace in a case of acquiring the environment information having an accuracy and information amount necessary for the executing the objective task, and
wherein the at least one processor is configured to execute the instructions to generate, based on the abstract state and the objective task, a second sequence of subtasks to be executed by the controlled device.

11. The control device according to claim 1,
wherein the at least one processor is configured to execute the instructions to:
convert the objective task into a logical formula based on temporal logic;
generate a time step logical formula that is a logical formula representing a state at each time step for executing the objective task,
generate the sequence based on the time step logical formula.

12. The control device according to claim 1,
wherein the at least one processor is configured to execute the instructions to determine that the objective task cannot be completed, upon determining that there is a blind spot from an observation device which supplies the environment information.

13. A control method performed by a computer and comprising:
upon receiving a designation of an objective task to be executed by a controlled device, and in advance of setting a sequence of subtasks into which an objective task is decomposed, determining,
based on at least one of environment information relating to an environment observed in a workspace of the controlled device, state information relating to a state of the controlled device, and stored information that relating to the objective task to be executed by the controlled device,
whether or not the objective task can be completed;
setting, when it is determined that the objective task cannot be completed, an abstract state in the workspace as propositions to express the objective task as a logical formula based on at least one of the environment information or the stored information;
generating, based on the abstract state and the objective task, the sequence of subtasks to be executed by the controlled device; and
controlling the controlled device by transmitting a control signal including the sequence of subtasks to the controlled device.

14. A non-transitory computer readable storage medium storing a program executable by a computer to:
upon receiving a designation of an objective task to be executed by a controlled device, and in advance of setting a sequence of subtasks into which an objective task is decomposed, determine,
based on at least one of environment information relating to an environment observed in a workspace of the controlled device, state information relating to a state of the controlled device, and stored information that relating to the objective task to be executed by the controlled device,
whether or not the objective task can be completed;
set, if it is determined that the objective task cannot be completed, an abstract state in the workspace as propositions to express the objective task as a logical formula based on at least one of the environment information or the stored information;
generate, based on the abstract state and the objective task, the sequence of subtasks to be executed by the controlled device; and
control the controlled device by transmitting a control signal including the sequence of subtasks to the controlled device.

* * * * *